(12) United States Patent
Xia et al.

(10) Patent No.: US 8,265,177 B2
(45) Date of Patent: Sep. 11, 2012

(54) SYSTEM AND METHOD FOR WIRELESS COMMUNICATION OF UNCOMPRESSED HIGH DEFINITION VIDEO DATA USING BEAMBOOK-CONSTRUCTED BEAMFORMING SIGNALS

(75) Inventors: Pengfei Xia, Mountain View, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 835 days.

(21) Appl. No.: 11/864,656

(22) Filed: Sep. 28, 2007

(65) Prior Publication Data
US 2008/0144751 A1 Jun. 19, 2008

Related U.S. Application Data

(60) Provisional application No. 60/875,065, filed on Dec. 15, 2006, provisional application No. 60/903,961, filed on Feb. 28, 2007, provisional application No. 60/872,974, filed on Dec. 4, 2006, provisional application No. 60/872,949, filed on Dec. 4, 2006.

(51) Int. Cl.
*H04K 1/10* (2006.01)
(52) U.S. Cl. ............ 375/260; 375/259; 375/240.1; 455/59
(58) Field of Classification Search ............ 375/260, 375/240.1
See application file for complete search history.

(56) References Cited

U.S. PATENT DOCUMENTS

| | | | | |
|---|---|---|---|---|
| 4,660,202 A | * | 4/1987 | Woodsum | 714/804 |
| 6,868,133 B2 | * | 3/2005 | Hicks et al. | 375/341 |
| 6,888,809 B1 | | 5/2005 | Foschini et al. | |
| 7,058,005 B2 | * | 6/2006 | Ehrmann-Patin et al. | 370/208 |
| 7,209,556 B2 | * | 4/2007 | Ohkuma et al. | 380/37 |
| 7,292,877 B2 | | 11/2007 | Yoon et al. | |
| 7,551,682 B2 | * | 6/2009 | Na et al. | 375/267 |
| 7,570,210 B1 | | 8/2009 | Nabar et al. | |

(Continued)

FOREIGN PATENT DOCUMENTS

EP 0537932 A2 4/1993
(Continued)

OTHER PUBLICATIONS

FreshNews.com, SiBEAM Receives Equity Investment from Best Buy, http://freshnews.com/print/node/261440, Jan. 4, 2010, 2 pages.

(Continued)

*Primary Examiner* — David Ometz
*Assistant Examiner* — Santiago Garcia
(74) *Attorney, Agent, or Firm* — Kenneth L. Sherman, Esq.; Michael Zarrabian, Esq.; Sherman & Zarrabian LLP

(57) ABSTRACT

A system and method for generating a number of candidate beamforming vectors for transmission of high definition video data over a wireless medium is disclosed. In one embodiment the system comprises a memory configured to store a plurality of candidate beamforming vectors and a processor for executing software configured to i) determine the number (N) of transmitter antennas and the number (Q) of candidate beamforming vectors to be constructed, ii) provide a discrete Fourier transform (DFT) matrix comprising Q rows and Q columns, iii) select N rows of the DFT matrix, and iv) generate an abridged matrix using the selected N rows, wherein each column of the abridged matrix is configured to be used as a candidate beamforming vector for transmission of a high definition video data signal.

32 Claims, 13 Drawing Sheets

U.S. PATENT DOCUMENTS

| | | | |
|---|---|---|---|
| 7,583,982 B2 | 9/2009 | Olesen et al. | |
| 7,634,015 B2 | 12/2009 | Waxman | |
| 7,684,761 B2 | 3/2010 | Hottinen | |
| 7,714,781 B2 | 5/2010 | Xia et al. | |
| 7,751,495 B1* | 7/2010 | Palanivelu et al. | 375/267 |
| 7,778,607 B2 | 8/2010 | Withers, Jr. et al. | |
| 7,804,800 B2 | 9/2010 | Li et al. | |
| 2001/0048725 A1* | 12/2001 | Hicks et al. | 375/341 |
| 2002/0027708 A1* | 3/2002 | Lin et al. | 359/385 |
| 2002/0085486 A1* | 7/2002 | Ehrmann-Patin et al. | 370/210 |
| 2003/0107985 A1* | 6/2003 | Sun et al. | 370/206 |
| 2004/0047424 A1* | 3/2004 | Ramaswamy et al. | 375/240.27 |
| 2004/0131011 A1 | 7/2004 | Sandell et al. | |
| 2004/0146117 A1* | 7/2004 | Subramaniam et al. | 375/260 |
| 2004/0214604 A1 | 10/2004 | Yoon et al. | |
| 2005/0129136 A1* | 6/2005 | Fujii et al. | 375/260 |
| 2005/0195734 A1* | 9/2005 | Sandell et al. | 370/208 |
| 2005/0286663 A1* | 12/2005 | Poon | 375/347 |
| 2006/0039493 A1 | 2/2006 | Mukkavilli et al. | |
| 2006/0067413 A1 | 3/2006 | Tsai | |
| 2006/0146692 A1 | 7/2006 | Gorokhov et al. | |
| 2007/0014272 A1* | 1/2007 | Palanki et al. | 370/344 |
| 2007/0098063 A1* | 5/2007 | Reznic et al. | 375/240.2 |
| 2007/0115797 A1* | 5/2007 | Reznic et al. | 370/203 |
| 2007/0171304 A1* | 7/2007 | Reznic et al. | 348/473 |
| 2007/0177670 A1* | 8/2007 | Elnathan et al. | 375/240.18 |
| 2007/0189397 A1* | 8/2007 | Ngo et al. | 375/240.26 |
| 2007/0198887 A1* | 8/2007 | Reznic et al. | 714/752 |
| 2007/0217546 A1* | 9/2007 | Sandell et al. | 375/299 |
| 2007/0280116 A1 | 12/2007 | Wang et al. | |
| 2007/0280386 A1* | 12/2007 | Waes et al. | 375/347 |
| 2007/0286063 A1* | 12/2007 | Aulin | 370/203 |
| 2007/0286304 A1* | 12/2007 | Kim et al. | 375/267 |
| 2008/0055485 A1* | 3/2008 | Elnathan et al. | 348/723 |
| 2008/0063034 A1* | 3/2008 | Yang et al. | 375/148 |
| 2008/0076370 A1 | 3/2008 | Kotecha et al. | |
| 2008/0080449 A1 | 4/2008 | Huang et al. | |
| 2008/0080634 A1 | 4/2008 | Kotecha et al. | |
| 2008/0089396 A1* | 4/2008 | Zhang et al. | 375/220 |
| 2008/0095259 A1* | 4/2008 | Dyer et al. | 375/265 |
| 2008/0130764 A1 | 6/2008 | Xia et al. | |
| 2008/0130778 A1* | 6/2008 | Xia et al. | 375/267 |
| 2008/0134254 A1 | 6/2008 | Xia et al. | |
| 2008/0144751 A1* | 6/2008 | Xia et al. | 375/347 |
| 2008/0204319 A1 | 8/2008 | Niu et al. | |
| 2008/0231502 A1* | 9/2008 | Allen et al. | 342/25 F |
| 2008/0317150 A1 | 12/2008 | Alexander et al. | |
| 2009/0033555 A1* | 2/2009 | Niu et al. | 342/372 |
| 2009/0046765 A1 | 2/2009 | Xia et al. | |
| 2009/0046798 A1 | 2/2009 | Xia et al. | |
| 2009/0132851 A1 | 5/2009 | Pruthi | |
| 2009/0141824 A1 | 6/2009 | Xia et al. | |
| 2009/0207765 A1* | 8/2009 | Yamaura | 370/310 |
| 2009/0233556 A1 | 9/2009 | Xia et al. | |

FOREIGN PATENT DOCUMENTS

| | | |
|---|---|---|
| KR | 2001/0076252 A | 8/2001 |
| KR | 2003/0083207 A | 10/2003 |
| KR | 2007/0089748 A | 8/2007 |
| WO | WO 01/43309 | 6/2001 |
| WO | WO 02/35853 A2 | 5/2002 |
| WO | WO 2006/007571 A1 | 1/2006 |

OTHER PUBLICATIONS

Hachman, "CE Giants back Amimon's Wireless HDTV Tech," online: www.pcmag.com, 1 page, Jul. 23, 2008.

NEC develops compact millimeter-wave transceiver for uncompressed HDTV signal transmission, NE Asia Online, Apr. 5, 2005, (Downloaded from http://neasia.nikkeibp.com/topstory/000913 on Sep. 29, 2006.).

Van Veen et al., Beamforming: A Versatile Approach to Spatial Filtering, IEEE ASSP Magazine, Apr. 1988, 5: 4-24.

International Search Report for PCT/KR2007/003172 dated on Nov. 19, 2007.

Babak Hassibi and Bertrand M. Hochwald, "How Much Training is Needed in Multiple-Antenna Wireless Links?", IEEE Transactions on Information Theory, vol. 49, No. 4, Apr. 2003.

Pengfei Xia et al., "Adaptive MIMO-OFDM Based on Partial Channel State Information", IEEE Transactions on signal processing, vol. 52, No. 1, Jan. 2004.

Pengfei Xia et al., "Achieving the Welch Bound With Difference Sets", IEEE Transactions on Information Theory, vol. 51, No. 5, May 2005.

G. David Forney, Jr., "Burst-Correcting Codes for the Classic Bursty Channel", IEEE Transactions on Cummunications Technology, vol. Com-19, No. 56, Oct. 1971.

Sinil Kim, et al., "Prolongation of Drug Exposure in Cerebrospinal Fluid by Encapsulation into DepoFoam", Cancer Research 53, 1596-1598, Apr. 1, 1993.

"Digital Video Broadcasting (DVB); Framing structure, channel coding and modulation for digital terrestrial television", ETSI EN 300 744, v1.4.1. (Jan. 2001).

Caetano, Lianne, SiBEAM—60 GHz Architecture for Wireless Video Display, SiBEAM, Inc. White Paper, Mar. 2006, [Available online: http://www.sibeam.com/whtpapers/60_GHz_for_WirelessHD_3_06.pdf] , pp. 1-6.

International Search Report and Written Opinion dated Aug. 19, 2009 in PCT/KR2009/00698, filed Feb. 13, 2009.

U.S. Office Action dated Sep. 2, 2010 in U.S. Appl. No. 11/864,721, filed Sep. 28, 2007.

U.S. Office Action dated Sep. 2, 2010 in U.S. Appl. No. 11/864,753, filed Sep. 28, 2007.

U.S. Notice of Allowance for U.S. Appl. No. 12/368,912 mailed Feb. 27, 2012.

U.S. Non-Final Office Action for U.S. Appl. No. 12/368,912 mailed Sep. 6, 2011.

* cited by examiner

FIG. 10B

| N | [r1 r2 ... rN] | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|
| 7 | 4 | 8 | 9 | 13 | 18 | 29 | 33 | | | | | | | | | | | | | | | | | | | | | | | | | | | | |
| 8 | 2 | 4 | 6 | 7 | 10 | 21 | 26 | 28 | 36 | | | | | | | | | | | | | | | | | | | | | | | | | | |
| 9 | 5 | 13 | 17 | 19 | 21 | 22 | 25 | 26 | 32 | | | | | | | | | | | | | | | | | | | | | | | | | | |
| 10 | 6 | 8 | 11 | 17 | 18 | 27 | 33 | 34 | 35 | 36 | | | | | | | | | | | | | | | | | | | | | | | | | |
| 11 | 6 | 7 | 11 | 15 | 17 | 19 | 22 | 24 | 25 | 27 | 35 | | | | | | | | | | | | | | | | | | | | | | | | |
| 12 | 2 | 3 | 5 | 18 | 22 | 25 | 26 | 31 | 32 | 34 | 35 | 36 | | | | | | | | | | | | | | | | | | | | | | | |
| 13 | 3 | 5 | 11 | 13 | 18 | 20 | 21 | 22 | 23 | 24 | 28 | 30 | 33 | | | | | | | | | | | | | | | | | | | | | | |
| 14 | 3 | 6 | 8 | 10 | 12 | 14 | 15 | 15 | 19 | 22 | 17 | 22 | 26 | 31 | 32 | 34 | 35 | 36 | | | | | | | | | | | | | | | | | |
| 15 | 1 | 9 | 11 | 12 | 13 | 14 | 15 | 16 | 17 | 22 | 23 | 24 | 25 | 26 | 27 | 29 | 35 | 36 | | | | | | | | | | | | | | | | | |
| 16 | 3 | 5 | 7 | 11 | 15 | 16 | 17 | 19 | 21 | 23 | 27 | 28 | 30 | 31 | 34 | 36 | | | | | | | | | | | | | | | | | | | |
| 17 | 1 | 2 | 3 | 4 | 6 | 7 | 13 | 16 | 18 | 19 | 20 | 21 | 22 | 25 | 27 | 29 | 33 | | | | | | | | | | | | | | | | | | |
| 18 | 3 | 4 | 4 | 6 | 7 | 9 | 11 | 12 | 15 | 16 | 17 | 18 | 20 | 21 | 24 | 25 | 26 | 28 | 29 | 30 | 32 | 34 | 36 | | | | | | | | | | | | |
| 19 | 1 | 2 | 3 | 9 | 10 | 13 | 14 | 15 | 16 | 18 | 21 | 23 | 24 | 25 | 26 | 28 | 29 | 33 | 36 | | | | | | | | | | | | | | | | |
| 20 | 3 | 4 | 9 | 10 | 11 | 12 | 13 | 14 | 15 | 17 | 18 | 21 | 23 | 24 | 26 | 28 | 29 | 31 | 32 | 34 | 36 | | | | | | | | | | | | | | |
| 21 | 1 | 4 | 5 | 7 | 8 | 9 | 11 | 12 | 14 | 16 | 17 | 18 | 19 | 20 | 23 | 24 | 25 | 28 | 29 | 31 | 33 | 34 | 35 | | | | | | | | | | | | |
| 22 | 2 | 3 | 4 | 6 | 8 | 9 | 11 | 12 | 13 | 14 | 17 | 18 | 21 | 22 | 23 | 24 | 25 | 27 | 28 | 29 | 30 | 32 | 33 | 34 | 36 | | | | | | | | | | |
| 23 | 2 | 3 | 4 | 5 | 8 | 9 | 12 | 13 | 14 | 15 | 17 | 18 | 19 | 20 | 22 | 23 | 24 | 25 | 27 | 28 | 29 | 30 | 31 | 32 | 33 | 35 | | | | | | | | | |
| 24 | 1 | 2 | 4 | 5 | 6 | 8 | 9 | 11 | 13 | 14 | 15 | 16 | 17 | 18 | 19 | 20 | 21 | 22 | 23 | 24 | 25 | 27 | 28 | 30 | 32 | 33 | 34 | 36 | | | | | | | | |
| 25 | 1 | 3 | 5 | 6 | 7 | 8 | 10 | 11 | 13 | 14 | 15 | 17 | 18 | 19 | 20 | 21 | 22 | 23 | 24 | 25 | 26 | 27 | 28 | 29 | 31 | 32 | 33 | 34 | 35 | | | | | | |
| 26 | 1 | 2 | 4 | 5 | 6 | 8 | 9 | 11 | 12 | 13 | 15 | 16 | 17 | 18 | 19 | 20 | 21 | 22 | 23 | 24 | 25 | 26 | 27 | 28 | 29 | 30 | 31 | 32 | 33 | 35 | 36 | | | | |
| 27 | 2 | 3 | 6 | 7 | 8 | 9 | 10 | 12 | 13 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | | | | |
| 28 | 1 | 2 | 4 | 6 | 7 | 8 | 9 | 10 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | | |
| 29 | 2 | 3 | 4 | 5 | 6 | 7 | 8 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | |
| 30 | 1 | 2 | 3 | 4 | 6 | 7 | 8 | 9 | 10 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | |
| 31 | 1 | 2 | 3 | 4 | 5 | 6 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
| 32 | 1 | 2 | 3 | 4 | 5 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
| 33 | 1 | 2 | 3 | 4 | 5 | 6 | 7 | 8 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
| 34 | 1 | 2 | 3 | 4 | 5 | 6 | 7 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
| 35 | 1 | 2 | 3 | 4 | 5 | 6 | 7 | 8 | 9 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
| 36 | 1 | 2 | 3 | 4 | 5 | 6 | 7 | 8 | 9 | 10 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |

SYSTEM AND METHOD FOR WIRELESS COMMUNICATION OF UNCOMPRESSED HIGH DEFINITION VIDEO DATA USING BEAMBOOK-CONSTRUCTED BEAMFORMING SIGNALS

CROSS-REFERENCE TO RELATED APPLICATIONS

This application claims priority under 35 US.C. §119(e) from US. Provisional Application Nos. 60/872,974 and 60/872,949 filed on Dec. 4, 2006, 60/875,065 filed on Dec. 15, 2006, and 60/903,961 filed on Feb. 28, 2007, which are hereby incorporated by reference in their entirety. This application also relates to U.S. patent application Ser. No. 11/864,707, entitled "System and method for wireless communication of uncompressed high definition video data using a beamforming acquisition protocol," U.S. patent application Ser. No. 11/864,753, entitled "System and method for wireless communication of uncompressed high definition video data using beamforming vector feedback based on hybrid quantization," and U.S. patent application Ser. No. 11/864,721, entitled "System and method for wireless communication of uncompressed high definition video data using a transfer matrix for beamforming estimation," concurrently filed with this application, which are herein incorporated by reference.

BACKGROUND OF THE INVENTION

1. Field of the Invention

The present invention relates to wireless transmission of video information, and in particular, to transmission of uncompressed high definition video information over wireless channels.

2. Description of the Related Technology

With the proliferation of high quality video, an increasing number of electronic devices, such as consumer electronic devices, utilize high definition (HD) video which can require multi-Gbps (gigabits per second) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless local area network (WLAN) and similar technologies can suffer interference issues when several devices that do not have the bandwidth to carry the uncompressed HD signals are connected together.

SUMMARY OF CERTAIN INVENTIVE ASPECTS

One aspect of the invention is a method of generating a number of candidate beamforming vectors for transmission of high definition video data over a wireless medium, the method comprising determining the number (N) of transmitter antennas, determining the number (Q) of candidate beamforming vectors to be constructed, providing a discrete Fourier transform (DFT) matrix comprising Q rows and Q columns, selecting N rows, and generating an abridged matrix using the selected N rows, wherein each column of the abridged matrix is configured to be used as a candidate beamforming vector for transmission of a high definition video data signal.

Another aspect of the invention is a system for generating a number of candidate beamforming vectors for transmission of high definition video data over a wireless medium, the system comprising a memory configured to store a plurality of candidate beamforming vectors and a processor for executing software configured to i) determine the number (N) of transmitter antennas and the number (Q) of candidate beamforming vectors to be constructed, ii) provide a discrete Fourier transform (DFT) matrix comprising Q rows and Q columns, iii) select N rows of the DFT matrix, and iv) generate an abridged matrix using the selected N rows, wherein each column of the abridged matrix is configured to be used as a candidate beamforming vector for transmission of a high definition video data signal.

Another aspect of the invention is one or more processor-readable storage devices having processor-readable code, the processor-readable code for programming one or more processors to perform a method of generating a number of candidate beamforming vectors for transmission of high definition video data over a wireless medium, the method comprising determining the number (N) of transmitter antennas, determining the number (Q) of candidate beamforming vectors to be constructed, providing a discrete Fourier transform (DFT) matrix comprising Q rows and Q columns, selecting N rows of the DFT matrix, and generating an abridged matrix using the selected N rows, wherein each column of the abridged matrix is configured to be used as a candidate beamforming vector for transmission of a high definition video data signal.

BRIEF DESCRIPTION OF THE DRAWINGS

FIG. 10*b* shows the selected rows of the matrix of FIG. 10*a* which optimize a metric according to one embodiment of the invention.

DETAILED DESCRIPTION OF CERTAIN INVENTIVE EMBODIMENTS

Certain embodiments provide a method and system for transmission of uncompressed HD video information from a sender to a receiver over wireless channels.

System Overview

Figure 1:
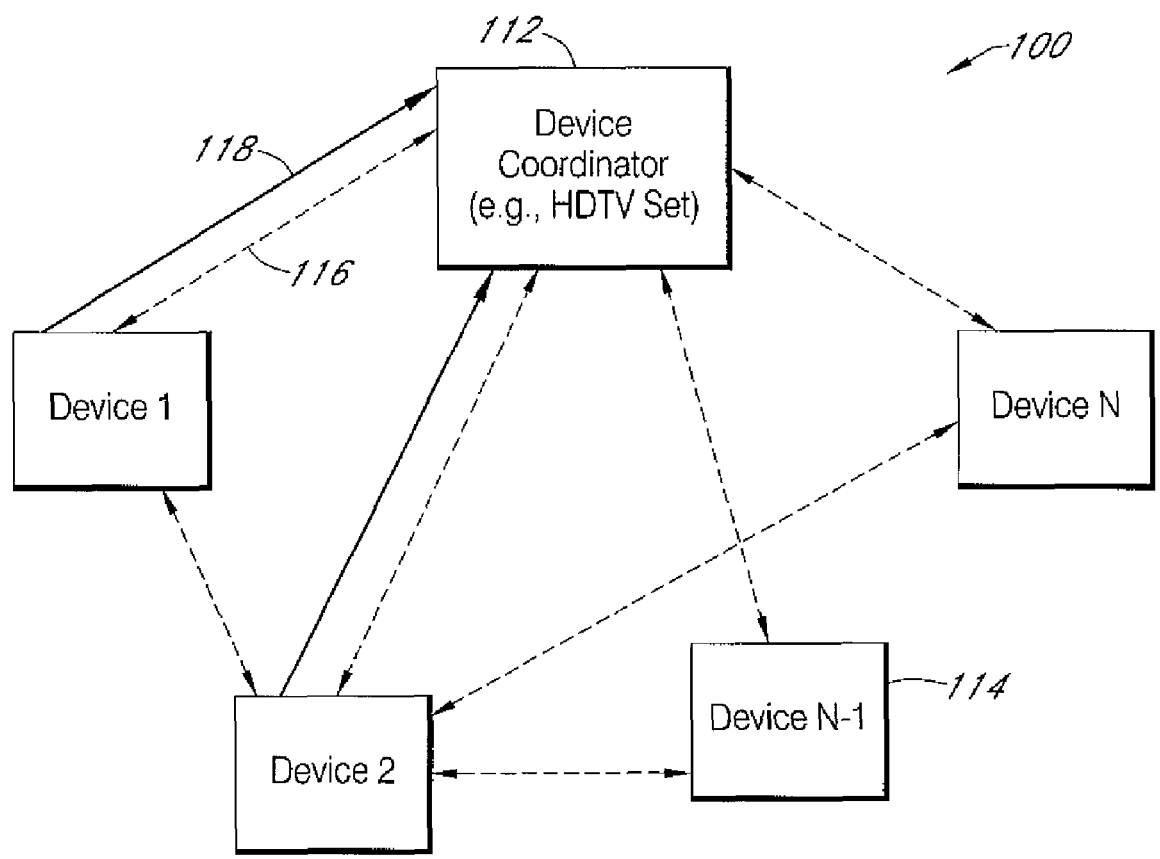
FIG. 1 is a functional block diagram of a wireless network that implements uncompressed HD video transmission between wireless devices according to one embodiment of the invention.

Example embodiments of the invention in a wireless high definition (HD) audio/video (A/V) system will now be described. FIG. 1 shows a functional block diagram of a wireless network 100 that implements uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple A/V stations 114 (e.g., Device 1 . . . Device N). The A/V stations 114 utilize a low-rate (LR) wireless channel 116 (dashed lines in FIG. 1), and may use a high-rate (RR) channel 118 (heavy solid lines in FIG. 1), for communication between any of the devices. The device coordinator 112 uses a low-rate channel 116 and a high-rate wireless channel 118, for communication with the stations 114.

Each station 114 uses the low-rate channel 116 for communications with other stations 114. The high-rate channel 118 supports single direction unicast transmission over directional beams established by beamforming, with e.g., multi-Gb/s bandwidth, to support uncompressed HD video transmission. For example, a set-top box can transmit uncompressed video to a HD television (HDTV) over the high-rate channel 118. The lowrate channel 116 can support bi-directional transmission, e.g., with up to 40 Mbps throughput in certain embodiments. The low-rate channel 116 is mainly used to transmit control frames such as acknowledgement (ACK) frames. For example, the low-rate channel 116 can transmit an acknowledgement from the HDTV to the set-top box. It is also possible that some lowrate data like audio and compressed video can be transmitted on the low-rate channel between two devices directly. Time division duplexing (TDD) is applied to the high-rate and low-rate channel. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (hereinafter "receiver 112"), and the station 114 is a sender of the video information (hereinafter "sender 114"). For example, the receiver 112 can be a sink of video and/or audio data implemented, such as, in an HDTV set in a home wireless network environment which is a type of WLAN. In another embodiment, the receiver 112 may be a projector. The sender 114 can be a source of uncompressed video or audio. Examples of the sender 114 include a set-top box, a DVD player or recorder, digital camera, camcorder, other computing device (e.g., laptop, desktop, PDA, etc.), and so forth.

Figure 2:
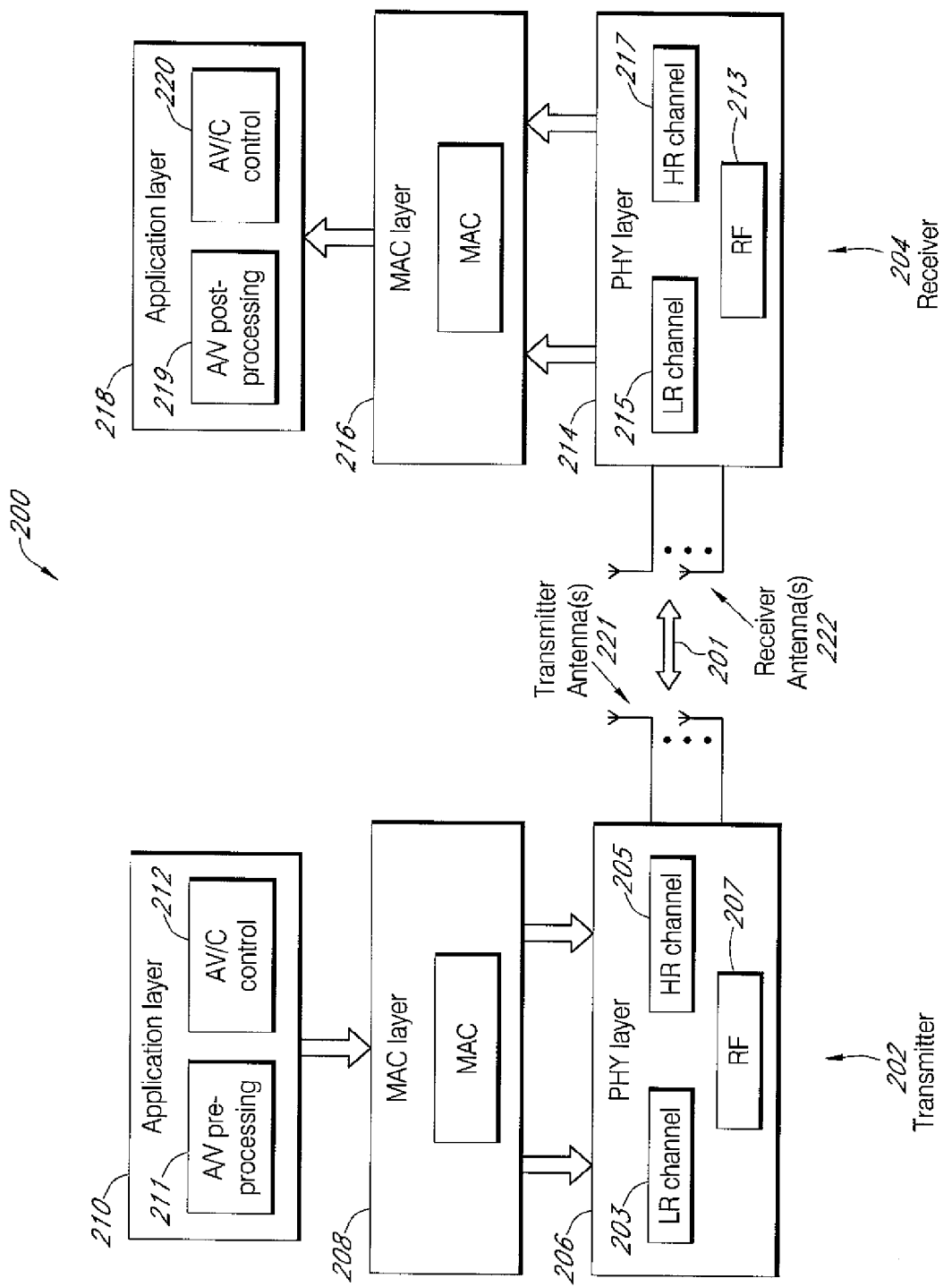
FIG. 2 is a functional block diagram of an example communication system for transmission of uncompressed HD video over a wireless medium, according to one embodiment of the invention.

FIG. 2 illustrates a functional block diagram of an example communication system 200. The system 200 includes a wireless transmitter 202 and wireless receiver 204. The transmitter 202 includes a physical (PRY) layer 206, a media access control (MAC) layer 208 and an application layer 210. Similarly, the receiver 204 includes a PRY layer 214, a MAC layer 216, and an application layer 218. The PRY layers provide wireless communication between the transmitter 202 and the receiver 204 via one or more antennas through a wireless medium 201.

The application layer 210 of the transmitter 202 includes an A/V preprocessing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216, process the received packets. The PHY layer 214 includes a RF module 213 connected to the one or more antennas. A LR channel 215 and a RR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the uncompressed video, for example. The AV/C module 220 operates in a complementary way with the AV/C module 212 of the transmitter 202.

General Beamforming

Transmit and/or receive beamforming has the potential of improving link quality substantially in wireless communications. For typical multiple-input/multiple-output (MIMO) systems, transmit and/or receiver beamforming are implemented in the digital domain, before a digital to analog conversion (DAC) operation at a transmitter side and after an analog-to-digital conversion (ADC) operation at a receiver side. The good performance of digitally beamformed systems comes at a cost of N+M RF chains, where N is the number of transmitter antennas and M is the number of receiver antennas. The cost may become formidable, especially when the sampling frequency increases. When cost-effectiveness becomes a dominant system design issue, analog beamforming is more favorable, as it requires only 1 RF chain.

We next illustrate analog beamforming for MIMO OFDM (orthogonal frequency division multiplex) systems, while the same scheme can be applied to MIMO single carrier modulated systems as well. Suppose that K is the number of subcarriers for OFDM modulation, N is the number of transmitter antennas, and M is the number of receiver antennas. Also, assume that the transmit beamforming vector is $\vec{w}=[w_1, w_2, \ldots, w_N]^T$ and the receive beamforming vector is $\vec{v}=[v_1, v_2, \ldots, v_N]^T$. Also, let L+1 be the maximum number of multipath channel taps for each pair of transmit and receive antennas. Without loss of generality, it is reasonable to have K>>L+1 (i.e. the number of OFDM sub-carriers is much greater than the maximum number of multipath channel taps between any pair of transmitter and receiver antennas). Further, let $\vec{h}_{ij}=[h_{1ij}(0), h_{ij}(1), h_{ij}(2) \ldots h_{ijN}(L)0 \ldots 0]^T$ be the multipath channel impulse response between the ith receive and jth transmit antenna, appended with zeros such that each vector $\vec{h}_{ij}$ is of size K×1. There are altogether M×N such channel vectors, with each one corresponding to one transmit and receive antenna pair. Let S=diag($S_1, S_2, \ldots, S_K$) be a diagonal matrix containing all the K data sub-carriers in an OFDM system. Thus, the transmitted vector (over an OFDM symbol duration) on a jth transmitter antenna after beamforming is $[w_j s_1, w_j s_2, \ldots w_j s_K]$, for j=1, 2, ..., N. Because OFDM modulation diagonalizes the multipath channel, the received vector (over an OFDM symbol duration) on the ith receive antenna can be written as $$\vec{y}_i = \sum_{j=1}^{N} w_j S \vec{c}_{ij},$$

where $\vec{C}_{ij} = F_K \vec{h}_{ij}$ is the frequency channel response corresponding to the time-domain channel $\vec{h}_{ij}$, $w_j$ is the jth transmit beamforming coefficient, and $F_K$ is a K×K Fourier transform matrix.

At the receiver side, the received vectors $\vec{y}_i$ across all M receiver antennas will be combined by receive beamforming vectors $\vec{v}=[v_1, v_2, \ldots, v_N]^T$, where $v_i$ is the ith receive beamforming coefficient. For this reason, the combined signal vector can be written as $$\vec{Z} = \sum_{i=1}^{M} v_i \vec{y}_i = \sum_{i=1}^{M} v_i \sum_{j=1}^{N} w_j S \vec{c}_{ij} = S \sum_{i=1}^{M} v_i \sum_{j=1}^{N} w_j \vec{c}_{ij}$$

$$\vec{Z} = S \sum_{i=1}^{M} v_i A_i \vec{w}$$

$$\vec{Z} = SA\vec{v}$$

Where the K×N matrix $A_i$ is defined as $A_i = [\vec{c}_{i1}, \vec{c}_{i2}, \ldots, \vec{c}_{iN}]$, and the K×N matrix A is defined as $$A = \sum_{i=1}^{M} v_i A_i.$$

Similarly, the received signal vector can be written as $$\vec{Z} = S \sum_{j=1}^{N} w_j \sum_{i=1}^{M} v_i \vec{c}_{ij}$$

$$\vec{Z} = S \sum_{j=1}^{N} w_j B_j \vec{v}$$

-continued $$\vec{Z} = SB\vec{w}$$

Where the K×M matrix $B_j$ is defined as $B_j = [\,]$, and the K×M matrix B is defined as $$B = \sum_{j=1}^{N} w_j B_j.$$

To optimize the transmit and receive beamforming vectors, one embodiment of the invention finds the transmit and receive beamforming vectors that jointly minimize the pair-wise error probability (PEP) between two arbitrary information codes. Toward this objective, one embodiment of the invention solves the following two problems simultaneously:

maximize $\vec{v}^H B^H B \vec{v}$ subject to $\|\vec{v}\|=1$ and maximize $\vec{w}^H A^H A \vec{w}$ subject to $\|\vec{w}\|=1$ It is noticed that the matrix A is dependent upon vector $\vec{w}$, while the matrix B is dependent upon vector $\vec{v}$. For this reason, the above two problems cannot be solved easily. To find the optimal beamforming vectors iteratively, a beamforming search algorithm has been proposed in U.S. patent application Ser. No. 11/881,978, filed on Jul. 30, 2007, entitled "Method and System for Analog Beamforming in Wireless Communication Systems," which is herein incorporated by reference.

Figure 3:
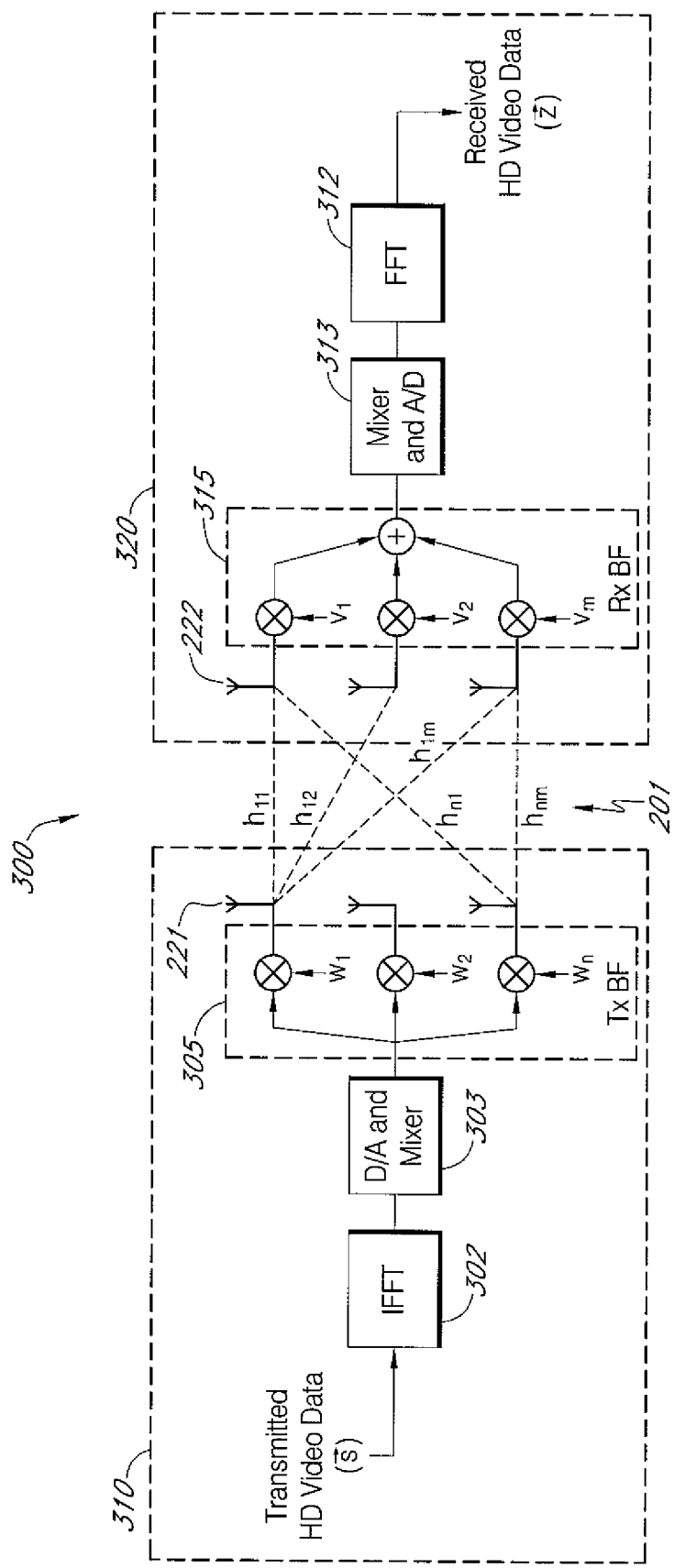
FIG. 3 is a diagram demonstrating an exemplary beamforming scheme of a wireless HD video communication system according to one embodiment of the invention.

FIG. 3 is a diagram demonstrating an exemplary beamforming scheme of wireless HD video communication system, as applied to an MIMO OFDM system. The disclosed invention can also be applied for non-OFDM modulated schemes, such as single carrier modulated systems. In one embodiment, the system 300 is for the implementation of analog beamforming. The system 300 includes a transmitter 310 and a receiver 320. The transmitter 310 includes a module 302 for performing an inverse Fourier transform, a module 303 for performing digital-to-analog conversion and mixing, a transmitter beamformer 305, and transmitter antennas 221. The receiver 320 includes a module 312 for performing a Fourier transform, a module 313 for performing analog-to-digital conversion and mixing, a receiver beamformer 315, and receiver antennas 222. The transmitter 310 and receiver 320 perform beamforming in conjunction with each other.

On the transmitter side, high definition video data, denoted by the vector $\vec{S}$, is input into the system 300. In one embodiment, the high definition video data is uncompressed. After an inverse Fourier transform (IFFT) 302, as well as digital-to-analog conversion and mixing 303, the modified video data is input into the transmitter beamformer 305. The weights of the transmitter beamformer 305 are denoted by the variables $w_i$, for i=1, 2, ..., N, where N is the number of the transmitter antennas 221. After being weighted by the transmitter beamformer 305, the data is transmitted by the transmitter antennas 221 through the wireless channel 201, where it is received by the receiver antennas 222. The receiver beamformer 315 acts upon the received data to demodulate it. The weights of the receiver beamformer 315 are denoted by the variables $v_i$ for $i=1, 2, \ldots, M$, where M is the number of the receiver antennas 222. After being processed by the receiver beamformer 315, the receiver data is input through the mixer and analog-to-digital converter 313. Also, a Fourier transform 312 is performed on the data to yield the final received high definition video data 311, denoted by the vector $\vec{z}$.

Figure 4A:
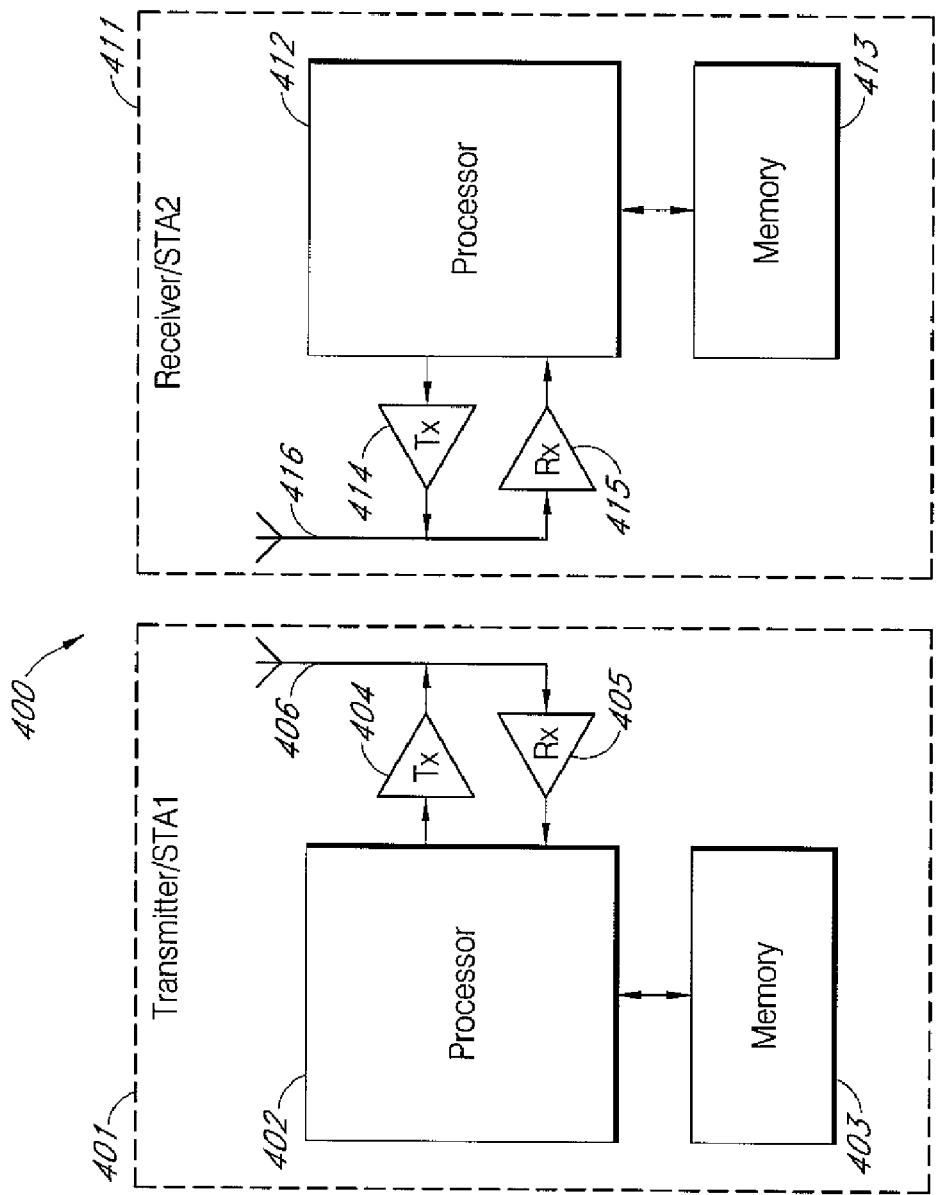
FIG. 4a is a block diagram illustrating the transmitter and receiver of a wireless HD video communication system according to one embodiment of the invention.

FIG. 4a is an exemplary block diagram illustrating the transmitter and receiver of a wireless HD video communication system according to one embodiment of the invention a system 400 includes two stations, denoted STA1 401 and STA2 411. Each station includes a processor 402,412 as well as a memory for storage 403,413. Each of the stations also includes a transceiver structure that further includes a transmitter 404,414 and a receiver 405,415 which connect to an antenna or set of antennas 406,416. The system 400 can perform at least one of i) a procedure 500 for creating an abridged DFT matrix so as to generate a set of candidate beamforming vectors, ii) a procedure 600 and 650 for iteratively acquiring beamforming vectors, iii) a procedure 800 for performing hybrid quantization and iv) a procedure 900 for creating an abridged unitary matrix so as to estimate system parameters.

In one embodiment, at least one of the procedures 500, 600, 650, 800 and 900 are implemented in a conventional programming language, such as C or C++ or another suitable programming language. In one embodiment of the invention, the program is stored on a computer accessible storage medium of the transmitter 401 and/or the receiver 411, for example, such as the memory 403 and/or 413. In another embodiment, the program can be stored in other system locations so long as it can perform at least one of the procedures 500, 600, 650, 800 and 900 according to embodiments of the invention. The storage medium may include any of a variety of technologies for storing information. In one embodiment, the storage medium includes a random access memory (RAM), hard disks, floppy disks, digital video devices, compact discs, video discs, and/or other optical storage mediums, etc.

In another embodiment, the processor 402 and/or 412 can be configured to or programmed to perform at least one of the procedures 500, 600, 650, 800 and 900. The program may be stored in the processor 402 and/or 412 or the memory 403 and/or 413. In various embodiments, the processor 402, 412 may have a configuration based on Intel Corporation's family of microprocessors, such as the Pentium family and Microsoft Corporation's Windows operating systems such as Windows 95/9812000/XP or Windows NT. In one embodiment, the processor is implemented with a variety of computer platforms using a single chip or multichip microprocessors, digital signal processors, embedded microprocessors, microcontrollers, etc. In another embodiment, the processor is enabled by a wide range of operating systems such as Unix, Linux, Microsoft DOS, Microsoft Windows 2000/9x1ME/XP, Macintosh OS, OS/2 and the like. In another embodiment, at least one of the procedures 500, 600, 650, 800 and 900 can be implemented with embedded software or firmware.

Figure 4B:
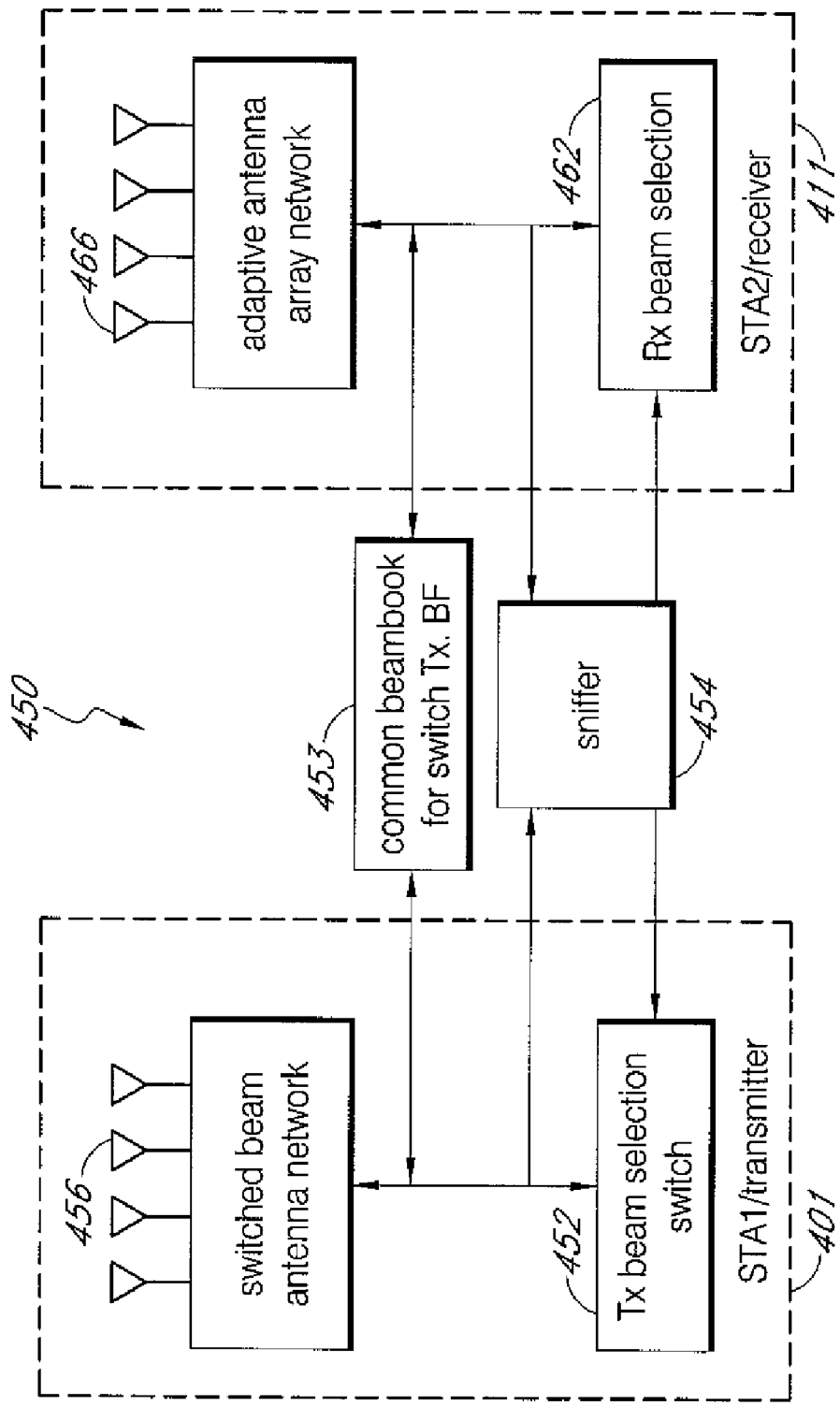
FIG. 4b is a block diagram illustrating the transmitter and receiver of a wireless HD video communication system, according to another embodiment of the invention.

FIG. 4b is an exemplary block diagram illustrating the transmitter and receiver of a wireless HD video communication system, according to another embodiment of the invention. In a system 450, the processor of STA1 401 includes a transmitter beam selection switch 452, and the memory of the transmitter 401 includes a common beambook 453. In one embodiment, the transmitter antenna is a switched beam antenna network 456. In one embodiment, the processor of STA2 411 performs receiver beam selection 462 and the memory of the receiver 411 includes the same common beambook 453. The receiver antenna of STA2 411 in this embodiment includes an adaptive antenna array network 466. Both stations 401,411 are connected to a sniffer 454 which acts to determine the channel parameters. The system 450 can perform at least one of the procedures 500, 600, 650, 800 and 900.

Creating a Beambook by Abridging a DFT Matrix

Because it takes much processing to maintain an adaptive antennas array network at both the transmitter and the receiver, it may be advantageous to restrict the transmitter beamformer 305 (see FIG. 3) to a common beambook 453 (see FIG. 4b), i.e., a pool of candidate beamforming vectors, from which the transmitter beamformer 305 will choose the final beamforming vector. In one embodiment, each candidate beamforming vector is an N-dimension vector, where N is the number of transmitter antennas 221 (see FIG. 3), while the pool contains Q candidate beamforming vectors in total, with Q also known as the beambook size and is a design parameter to be fixed.

According to one embodiment of the invention, per transmission packet, the transmitter sends out a preamble sequence to measure the channel and then the receiver makes a decision on which candidate beam is the best for the current packet and sends back the index of the best candidate beamforming vector to the transmitter. In this embodiment, the transmitter then looks it up in the common beambook 453 and uses the best candidate beam to carry out data/video communications. In this embodiment, a feedback of only $\log_2 Q$ bits is needed.

In one embodiment, a collection of candidate beamforming vectors (the beambook 453) are constructed in advance and stored at both the transmitter and receiver sides. One embodiment of the present invention creates this beambook.

Figure 5:
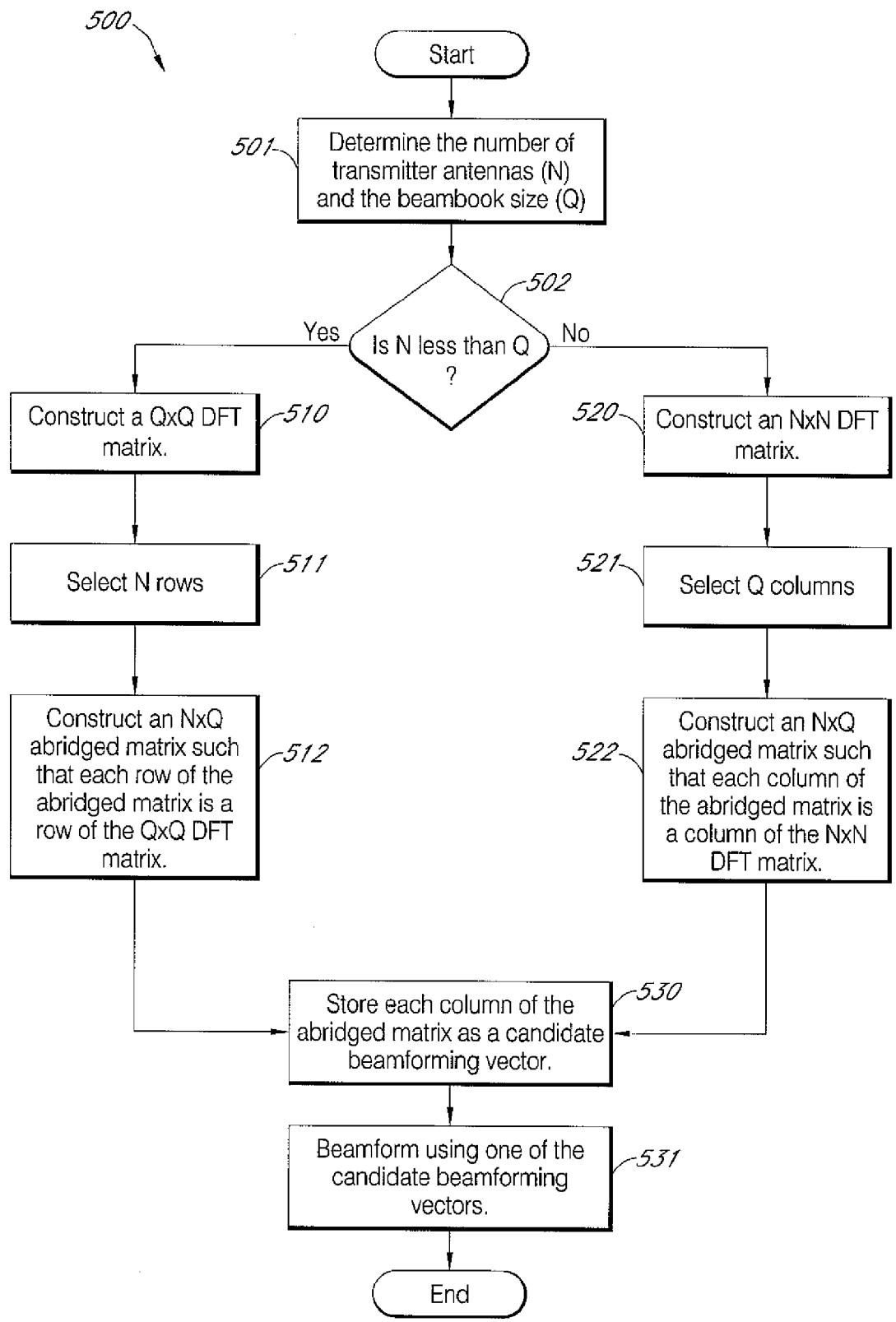
FIG. 5 is a flowchart which shows a beamforming procedure based on a discrete Fourier transform (DFT) matrix according to one embodiment of the invention.

FIG. 5 is a flowchart which shows a beamforming procedure 500 based on a discrete Fourier transform (DFT) matrix according to one embodiment of the invention. Depending on the embodiments, additional stages may be added, others removed, or the order of the stages may be changed in FIG. 5. This applies to the procedures 600, 650, 800 and 900 shown in FIGS. 6a, 6b, 8 and 9, respectively.

Referring to FIG. 5, the beamforming procedure 500 will be described in greater detail. The first stage of the procedure 500 is to determine the number of transmitter antennas (N) and the size of the beambook to be constructed (Q) (501). The next stage is to determine whether the number of transmitter antennas 221 is less than the beambook size (502). If N is less than Q, a DFT matrix having Q rows and Q columns is constructed (510). However, if N is not less than Q, a DFT matrix having N rows and N columns is constructed (520). From either stage 510 or 520, either N rows or Q columns are selected (511,512) from which an abridged matrix having N rows and Q columns is constructed (512, 522). In one embodiment, this may be done in order to minimize or maximize some metric of the matrix. For instance, the rows selected in stage 511 may be selected to make any pair of candidate beamforming vectors maximally separated, or separated as far as possible. In another embodiment, the rows selected in stage 511 may be selected such that the maximum correlation between any two columns of the resulting matrix is minimized Written mathematically, this can be stated as minimizing $$S = \max_{1 \leq i \neq j \leq Q} |w_i^H w_j|,$$

wherein, |α| indicates the absolute value of a and superscript H indicates complex transposition. In one embodiment, a computer search or some other algorithm can be used to find the best N rows such that the closeness metric is minimized. In another embodiment, other suboptimal criteria may be used as well during the search.

In stage 530, each column of the abridged matrix is stored as a candidate beamforming vector, thus creating the beambook 453. Transmitter beamforming is performed using the created candidate beamforming vectors (531).

In another embodiment, after having determined N and Q 501 and that N is less than Q 502, a Q×Q DFT matrix is obtained 510. The DFT matrix may be written as $$W_Q = \frac{1}{\sqrt{Q}} \begin{bmatrix} \sigma^{0 \cdot 0} & \sigma^{0 \cdot 1} & \cdots & \sigma^{0 \cdot (Q-1)} \\ \sigma^{1 \cdot 0} & \sigma^{1 \cdot 1} & \cdots & \sigma^{1 \cdot (Q-1)} \\ \vdots & \vdots & \ddots & M \\ \sigma^{(Q-1) \cdot 0} & \sigma^{(Q-1) \cdot 1} & \cdots & \sigma^{(Q-1)(Q-1)} \end{bmatrix},$$

where $$\sigma = e^{-\frac{2\pi i}{Q}}$$

is the Qth root of unity. Other variants of the DFT matrix, such as when the normalization constant is different, or the Qth root of unity is complex conjugated, can be used. Out of the Q rows of the matrix $W_Q$, N rows are chosen, with row indices $\{r_1, r_2, \ldots, r_N\}$ such that the chosen N rows create a matrix $$\Omega_Q = \frac{1}{\sqrt{Q}} \begin{bmatrix} \sigma_1^{r_1 \cdot 0} & \sigma_1^{r_1 \cdot 1} & \cdots & \sigma_1^{r_1 \cdot (Q-1)} \\ \sigma_2^{r_2 \cdot 0} & \sigma_2^{r_2 \cdot 1} & \cdots & \sigma_2^{r_2 \cdot (Q-1)} \\ \vdots & \vdots & \ddots & \vdots \\ \sigma^{r_N \cdot 0} & \sigma^{r_N \cdot 1} & \cdots & \sigma^{r_N \cdot (Q-1)} \end{bmatrix}$$

where $\Omega_Q$ has N rows and Q columns. The beambook is then constructed using $\Omega_Q$, such that each column of $\Omega_Q$ is a candidate beamforming vector, and the Q columns together form the desired beambook.

Construction of the beambook is not complete if the row indices $\{r_1, r_2, \ldots, r_N\}$ are unspecified. A computer search or some other algorithm may be used to select the N rows indices such that a closeness metric is minimized Mathematically, it is advantageous to perform the following:

$$\min_{\{r_1, r_2, \ldots, r_N\}} \left[ \max_{1 \leq l < k \leq Q} \frac{1}{Q} \left| \sum_{n=1}^{N} e^{i \frac{2\pi}{Q} r_n (k-1)} \right| \right].$$

In another embodiment of the invention, a subset of a so-constructed beambook may be used to construct a beambook of smaller size.

Iteratively Acquiring Beamforming Vectors

Although it may be possible to use the most general beamforming scheme at the transmitter and receiver side, as discussed above, it may be difficult to implement in practice. One difficulty is that obtaining beamforming vectors at the transmitter side requires a significant amount of feedback, especially when the number of transmitter antennas 221 is large, and may lower the system efficiency to an unacceptable level in certain scenarios. For example, using a 12-bit precision real number representation, a system with N=16 transmitter antennas 221 may require 16*12*2=384 feedback bits per packet. Such an amount of feedback required may significantly lower the system efficiency.

In one embodiment of the invention, implemented at the transmitter side is a switched beam antenna (SBA) array, also known as multi-beam selection or beamforming using limited feedback. The general idea on switching beams at the transmitter side is to maintain a common beambook 453, or pool of candidate transmit beamforming vectors, at both the transmitter side and the receiver side. Each candidate beam is an N-dimensional beamforming vector. For each packet, in one embodiment, a transmit beamforming vector is chosen only from this candidate pool.

In one embodiment, at the beginning of a packet, the transmitter sends out a measuring sequence to measure the multipath channel. The received sequence at the receiver side is then used to make a decision on which candidate beam is the best for the current packet. This decision, in the form of the index of the best beam, is then sent back to signal the best beam. Upon receiving the fed back index, the transmitter then looks it up in the common beambook 453 and transmits data (such as high definition video data) using the signaled best beam.

When the candidate pool or beambook size is Q, the required feedback amount is only $\log_2 Q$ bits. It is straightforward that more feedback bits lead to more precise feedback, and henceforth, better performance. In some embodiments, less than ten feedback bits are needed to reach satisfactory performance. In one embodiment, the same beambook 453 is maintained at both the transmitter and the receiver, thus guaranteeing interoperability between devices from different manufacturers.

In one embodiment, design of the beambook 453 can be optimized in certain cases. In one embodiment, construction of the beambook 453 is carried out off-line, and the same beambook is maintained at all devices. A beambook design method based on a discrete Fourier matrix has been disclosed above.

Compared to the switched beam antennas at the transmitter side used in some embodiments of the invention, a fully adaptive antenna array (AAA) may be used at the receiver side. Because there is no feedback needed for receive beamforming, fully adaptive antenna beamforming advantageously gives freedom in choosing the beamforming vector. In some embodiments, maximal ratio combining may be used to achieve optimal performance in terms of largest signal-to-noise ratio, while equal gain combining strikes an advantageous performance-complexity tradeoff. Many different combining methods may be used.

One embodiment provides a method of determining the transmit beamforming vector and the receive beamforming vector. The transmit beamforming vector determined by the disclosed method may advantageously be a selected beam from the common beambook 453. Alternatively, a beamforming vector for a fully adaptive transmitter antenna array may be determined.

Figure 6A:
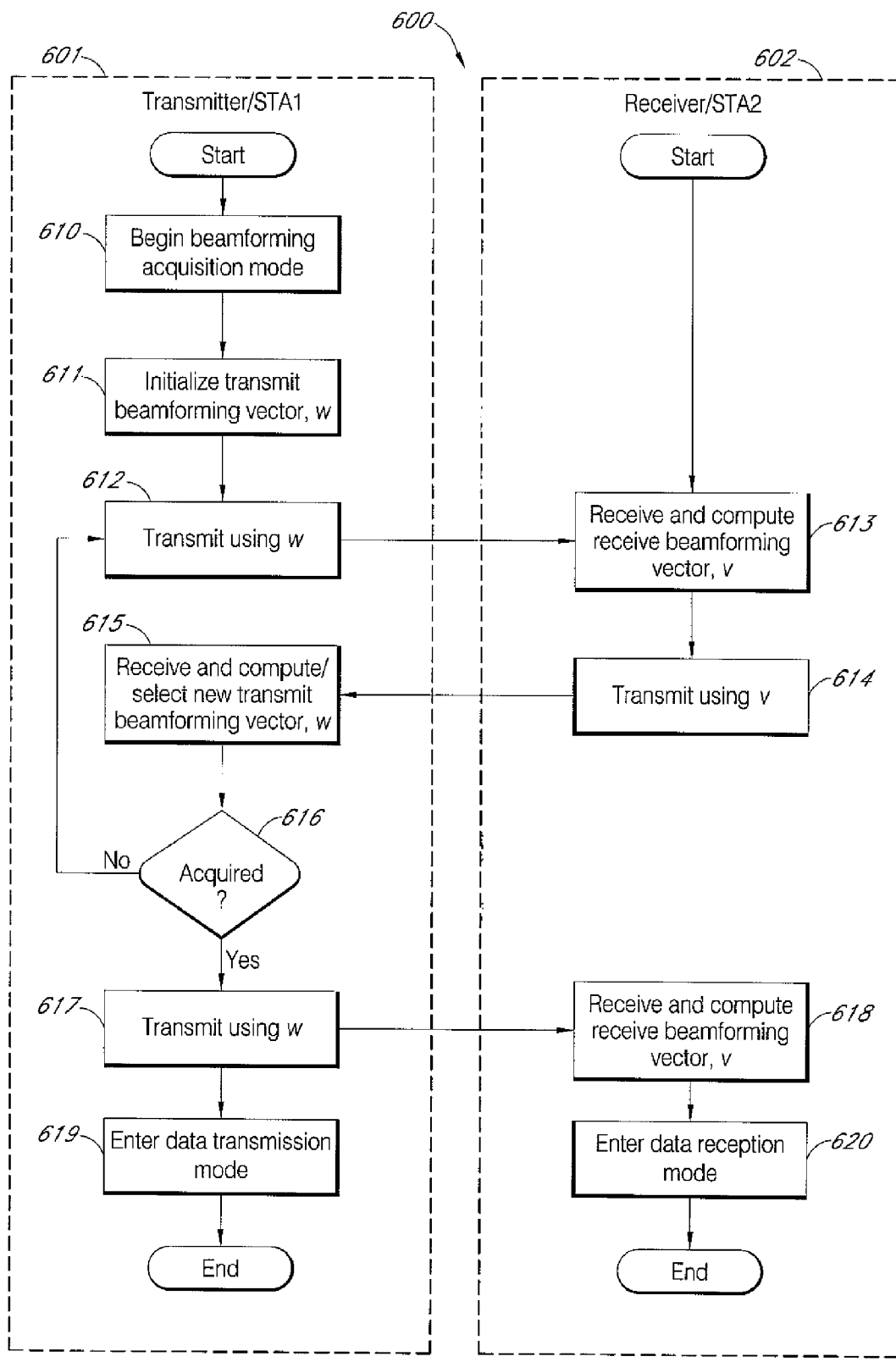
FIG. 6a is a flowchart which shows an iterative beamforming acquisition procedure according to one embodiment of the invention.

FIG. 6a is an iterative beamforming acquisition procedure 600 according to one embodiment of the invention. This procedure 600 involves a transmitter 601 (also referred to as STA1) and a receiver 602 (also referred to as STA2). The first stage for the transmitter 601 involves entering beamforming acquisition mode (610). The transmitter then initializes the transmit beamforming vector, $\vec{w}$ (611). The initialization may be chosen randomly, or the initial beamforming vector can be an omnidirectional beamforming vector. Other initialization methods may be used. The initial beamforming vector may be chosen from a common beambook if the system is implementing a switched antenna network. The procedures 600 and 650 can be applied equally to a system with and without a beambook.

After initializing the transmit beamforming vector, $\vec{w}$, the transmitter 601 transmits a signal using $\vec{w}$ (612). The receiver 602 receives this signal and based on this received signal computes a receive beamforming vector, $\vec{v}$(613). In one embodiment, different algorithms can be used to compute the receive beamforming vector. The receiver 602 (STA2) then transmits a signal back to STA1 601 using the calculated receive beamforming vector, $\vec{v}$(614). STA1 601 receives this signal and computes a new transmit beamforming vector, $\vec{w}$(615). In one embodiment, this computation may involve reselecting a candidate beamforming vector from the beambook, or, in other embodiment, this computation may involve a more complicated adaptive calculation. The transmitter 601 makes a determination as to whether or not the final transmit beamforming vector is acquired (616). In one embodiment, this determination may involve counting the number of times the transmit beamforming vector has been recalculated. In another embodiment, this determination may involve comparing the new transmit beamforming vector to previous transmit beamforming vectors.

In one embodiment, this determination may involve counting the number of times the transmit beamforming vector has been recalculated. In another embodiment, this determination may involve comparing the new transmit beamforming vector to previous transmit beamforming vectors.

If it is determined that the final transmit beamforming vector has not been acquired, stages 612-615 are repeated until it is determined that the final transmit beamforming vector has been acquired. When it has been determined that the final transmit beamforming vector has been acquired, a final transmission using the final transmit beamforming vector may be performed (617). Following this optional stage, the receiver 602 receives this final signal and computes a final receiver beamforming vector, $\vec{v}$(618). The transmitter 601 then enters data transmission mode and begins to transmit high definition video data (619). The receiver 602 enters data reception mode and begins to receiver high definition video data (620).

Figure 6B:
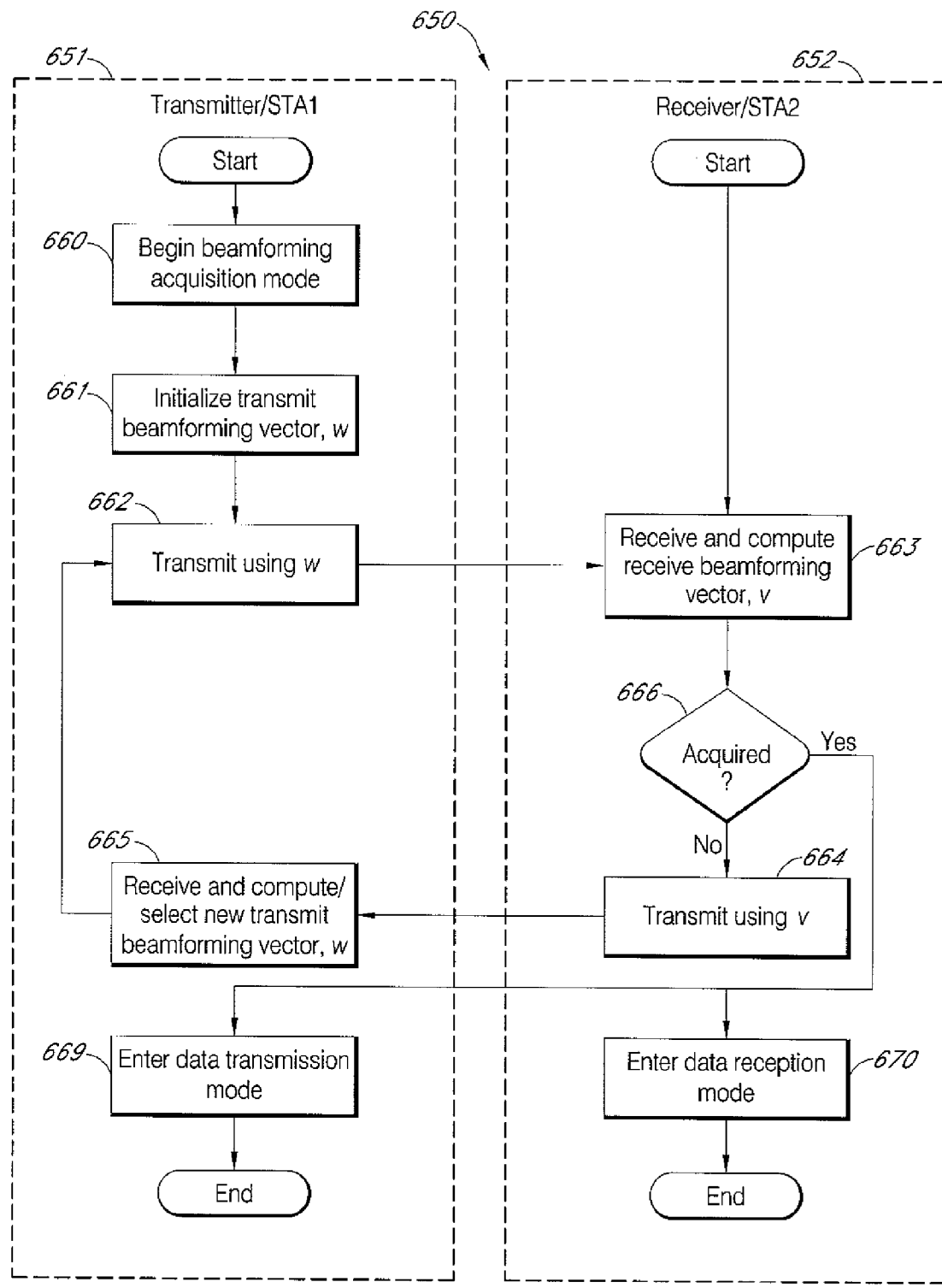
FIG. 6b is a flowchart which shows an iterative beamforming acquisition procedure according to another embodiment of the invention.

FIG. 6b is a flowchart which shows an iterative beamforming acquisition procedure 650 according to another embodiment of the invention. The main difference between the embodiments of FIGS. 6a and 6b is that the determining whether or not the transmit beamforming vector is acquired is performed by the receiver in FIG. 6b. The first stage of the transmitter 651 is to begin beamforming acquisition mode (660). The transmitter 651 then initializes the transmit beamforming vector, $\vec{w}$(661). After initialization, the transmitter 651 uses the transmit beamforming vector to send a signal to the receiver 652 (662). The receiver 652 receives the signal and uses it to compute the receive beamforming vector, $\vec{v}$(663). It is determined in the receiver 652 whether or not the final transmit beamforming vector has been acquired 666. In one embodiment, the determination may include the number of times the transmit beamforming vector has been computed/selected. In another embodiment, the determination may include a comparison between the current transmit beamforming vector and previous transmit beamforming vectors. In another embodiment, the determination may involve setting a threshold for the signal-to-noise level and determining whether the current transmit beamforming vector would provide a signal-to-noise level above the threshold. If the transmit beamforming vector is not acquired, the receiver/STA2 652 transmits back to the transmitter/STA1 651 using the computed receive beamforming vector, $\vec{v}$(664). STA1 651 then receives this signal and computes/selects a new transmit beamforming vector, $\vec{w}$(665). Stages 662 and 663 are then repeated. A determination on whether or not the transmit beamforming vector has been acquired is again performed, resulting in either a repetition of stages 664, 665, 662 and 663 or progressing to stages 669 and 670. In stage 669, upon acquiring the final transmitter beamforming vector the transmitter 651 enters data transmission mode and begins to transmit high definition video data (669). The receiver 652 enters data reception mode and begins to receiver high definition video data (670).

It can be noticed that acquisition of the transmit beamforming vector and the receive beamforming vector can take a few signal exchanges, and possibility take a long time. This may be unacceptable overhead if such a procedure is needed for each and every data packet. One embodiment uses such a procedure for each and every data packet. Alternatively, if the wireless channel is not changing, the procedure would not be needed for every packet.

Figure 7:
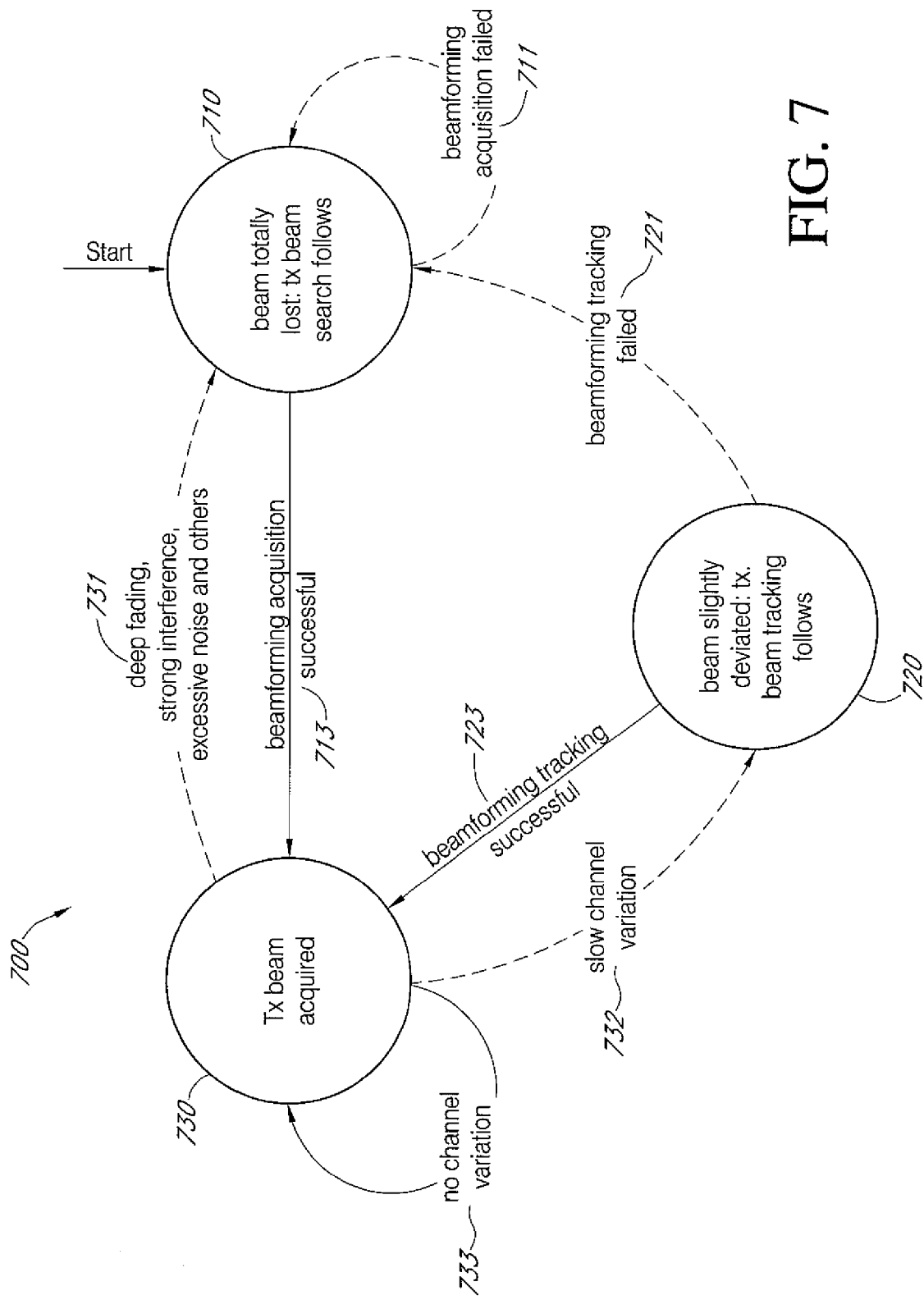
FIG. 7 is a flowchart which shows a beamforming acquisition and tracking procedure according to one embodiment of the invention.

For this reason, beam tracking can be used, instead of the full beamforming acquisition. Beam tracking can be thought of as a quick beam acquisition method. It will take less time than beam acquisition, but is not robust as beam acquisition. If the channel changes slowly, beam tracking may be sufficient instead of the full-length, powerful beam acquisition. FIG. 7 is a flowchart which shows a beamforming acquisition and tracking procedure 700 according to one embodiment of the invention.

When the system begins, the beamforming acquisition method described above can be used (710). Also, the beamforming acquisition method can be used again if it fails (711). Once beamforming acquisition is successful (713), the system enters a new state in which the transmit beamforming vector is acquired (730). If there is no channel variation, the transmit beamforming vector remains acquired (733). If, however, there is deep fading, strong interference, excessive noise, or other dramatic channel variation, the beam is lost and the beamforming acquisition method is performed (731). If there is slow channel variation, a beamforming tracking algorithm can be performed instead of the full acquisition method (732). When in the beamforming tracking algorithm state 720, a success 723 leads back to the state in which the transmit beamforming vector is acquired. If it fails 721, the beamforming acquisition algorithm is performed.

Beamforming Using Hybrid Quantization

The feedback requirements of sending a transmit beamforming vector from the receiver/STA2 to the transmitter/STA1 can be partially mitigated through the use of the common beambook 453, as described above. Another embodiment of the invention reduces the amount of necessary feedback in another way, using hybrid quantization.

In wireless video communication systems, because of stringent link budget requirements, a large number, typically on the order of about 20 to about 40, transmitter antennas 221 are generally needed. The straightforward way of feeding back the transmit beamforming vector would be sending back the beamforming coefficients one by one. Because each beamforming coefficient takes a complex value, in general, and each real value normally needs at least 16 bits for accurate representation, a minimum of 2*16*N bits are necessary to be sent back to the transmitter in order to accurately represent the exact beamforming vector. If N=36, for example, a total number of at least 2*16*32=1152 bits are needed, which is a huge number and incurs significant overhead and delay.

Naturally, reducing the number of feedback bits will sacrifice the performance somewhat. However, if a proper method is used, the feedback amount can be significantly reduced, without incurring considerable performance loss or huge computation complexity.

One embodiment writes each complex beamforming coefficient in polar form $$w_i = |w_i| e^{j\theta_i},$$

and instead of sending back the whole complex number $w_i$, one may just send back the phase information $\theta_i$. On the transmitter side, in lack of amplitude information, one may simply apply equal amplitude across all antenna elements, sometimes known as equal gain transmit beamforming Equal gain transmit beamforming would reduce the amount of necessary feedback by half, since only half the number of real values would need be feedback.

Another embodiment is focused on quantification of the transmit beamforming vector or other variation of the transmit beamforming vector. Quantization can be used as an alternative or in conjunction with the first approach of equal gain transmit beamforming. The discussed methods below are applicable to the phase information of the transmit beamforming vector, the transmit beamforming vector itself, or other variation of the transmit beamforming vector.

For discussion purposes, the phase information vector $[\theta_1, \theta_2, \ldots, \theta_N]$ will be quantized. The simplest method of quantization is scalar quantization. For each of the N phase components, $\theta_1, \theta_2, \ldots, \theta_N$, each $\theta_i$ is quantized separately. Associated with a scalar quantizer is a codebook $\{\beta_1, \beta_2, \ldots, \beta_R\}$ including all possible output values, also know as codewords, with $R=2^B$ known as the codebook size. In the scalar quantization case, each codeword $\beta_i$ is a scalar. Out of all possible R codewords, the quantizer chooses the codeword that is closest to the input $\theta$, say $\beta_x$, and outputs the index of it.

Thus, the output x is a positive integer between 1 and R, which calls for B bits of binary representation.

As we can see, the quantizer needs to determine the distance between an input $\theta$ and a codeword $\beta_i$. In general, it is denoted as $d(\beta_i, \theta)$. The codeword that is closest to the input $\theta$ is the codeword that minimizes the distance $d(\beta_i, \theta)$, for all i. Various distance metrics can be used, such as Euclidian distance, Hamming distance, and others.

Scalar quantization is attractive because it is simple, as each quantization is done in one-dimensional space. Also, the codebook size is normally small, since quantization is only done for one-dimensional real values. Nevertheless, it is not very efficient in terms of required feedback. Suppose again, that N=36 and B=2, a total of N*B=72 bits is required to be fed back to the transmitter.

An alternative to scalar quantization is vector quantization. Associated with a vector quantizer is a codebook $\{\beta_1, \beta_2, \ldots, \beta_R\}$ including all possible output values, also known as codewords. In the vector quantization case, each codeword $\beta_i$ is a vector in the N-dimensional space, where N is the number of transmitter antennas 221. Out of all possible R codewords, the quantizer chooses the codeword that is closest to the input vector $\vec{\theta}$, say $\vec{\beta}_x$, and outputs the index of it. Thus, the output x is a positive integer between 1 and R, which calls for B bits for binary representation. In general, we may denote the distance between an input $\vec{\theta}$ and a codeword $\vec{\beta}_i$ as $d(\vec{\beta}_i, \vec{\theta})$.

Vector quantization is advantageous in some cases because it is very efficient. It typically requires much less feedback than scalar quantization. There are also some drawbacks. First, for vector quantization, the codebook is typically much larger than in scalar quantization. This would not only cost more memory at the transmitter and receiver stations, but also cost more in terms of distance computations. The number of distance computations is proportional to the codebook size. Second, since each distance computation involves a computation in the N-dimensional space, the computational complexity would increase with N as well. Overall, vector quantization provides high efficiency at the cost of larger computational complexity and larger storage requirements.

One embodiment provides a hybrid quantization which combines the scalar and vector quantization. In one embodiment, the input vector is divided into multiple segments and vector quantization is performed for each segment.

Figure 8:
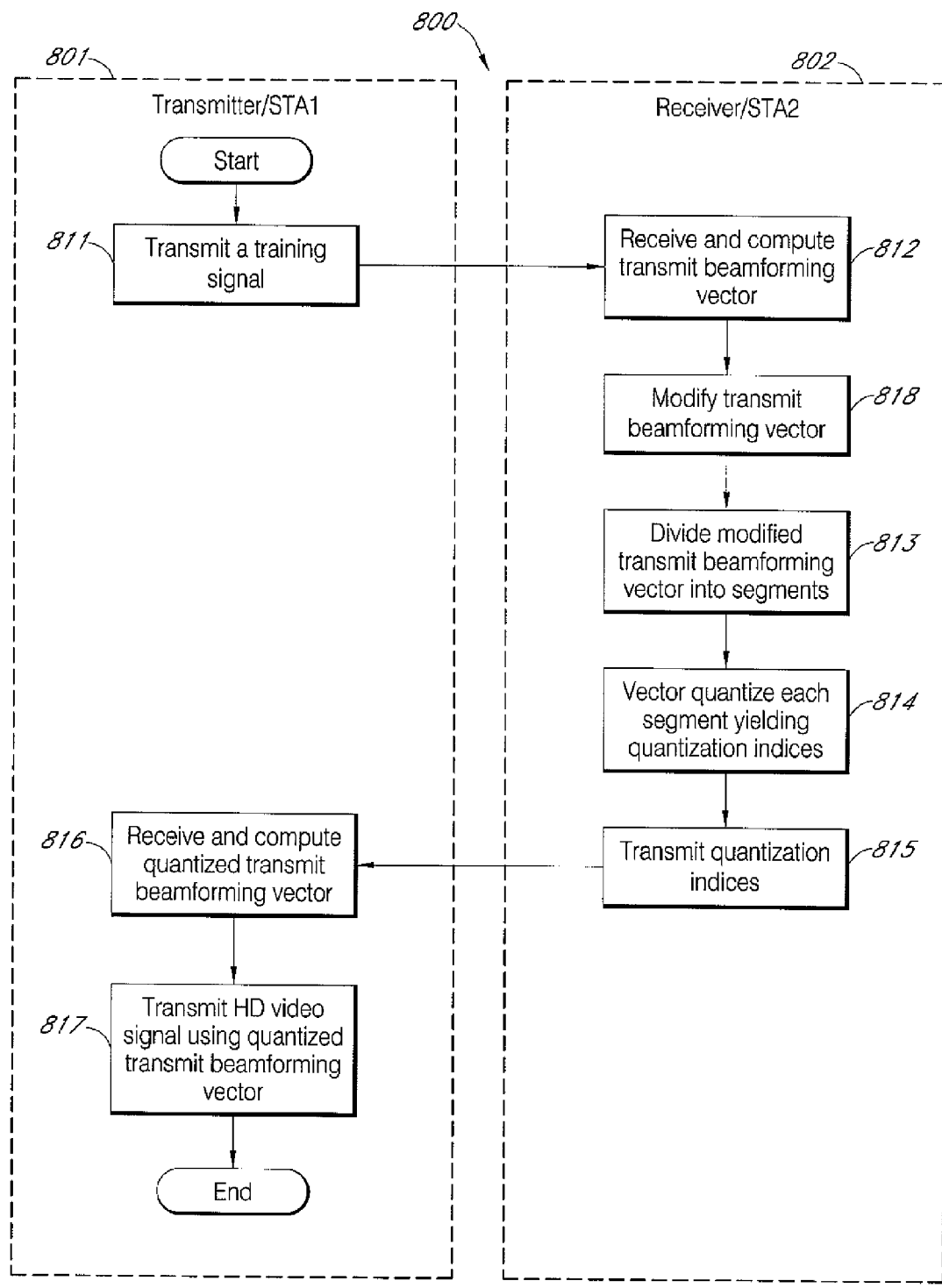
FIG. 8 is a flowchart which shows a beamforming procedure based on hybrid quantization according to another embodiment of the invention.

FIG. 8 is a flowchart which shows a beamforming procedure 800 based on hybrid quantization according to another embodiment of the invention. The procedure 800 involves a transmitter 801, also referred to as STA1, and a receiver 802, also referred to as STA2. The first stage is to have the STA1 801 transmit a training signal (811). This signal is received at STA2 802 where a transmit beamforming vector is computed (812). Optionally, the transmit beamforming is modified before the process continues. One possible modification is to retain only the phase information of the transmit beamforming vector. Another possible modification is to pre-quantize the transmit beamforming vector with a scalar quantization. Many possible modifications of the transmit beamforming vector are possible within the scope of the invention. The modified transmit beamforming vector is divided into segments (813). Each segment is fed into a vector quantizer of appropriate size yielding a set of indices (814). These quantization indices, positive integers between 1 and the codebook size, are transmitted from STA2 802 to STA1 801 (815). The codebook size may be different for different quantizers, used for different-sized segments. Some segments may only have one element. STA1 801 receives the indices, which are used to reconstitute a quantized transmit beamforming vector (816). A high definition video signal is transmitted using the quantized transmit beamforming vector (817).

In one embodiment, the hybrid quantization method applies equally to an even or odd number of antennae. Each segment of the transmit beamforming vector which is vector quantized need not be the same size. Some segments may even have only one element, in which case, the quantization corresponds to scalar quantization.

By means of an example, one embodiment of the invention related to hybrid quantization is discussed further. In one embodiment, let the number of transmitter antennas N be an even number N=2k. The hybrid quantization method is illustrated by the following example, where the segment size is 2.

In particular, one may divide the phase information vector $\vec{\theta} = [\theta_1, \theta_2, \ldots, \theta_N]^T$ into k segments $$\left\{ \begin{array}{cccc} \theta_1 & \theta_3 & \ldots & \theta_{2k-1} \\ \theta_2 & \theta_4 & \ldots & \theta_{2k} \end{array} \right\}$$

where each column represents a segment with size S=2. The phase information vector may be advantageously divided such that adjacent phase information elements are in the same column.

A small-dimensional vector quantization, in this case two-dimensional, can be applied for each segment one by one. Particularly, in this example, $$\left\{ \begin{matrix} \theta_1 \\ \theta_2 \end{matrix} \right\}$$

can be quantized first by two-dimensional quantization, followed by $$\left\{ \begin{matrix} \theta_3 \\ \theta_4 \end{matrix} \right\},$$

and finally $$\left\{ \begin{matrix} \theta_{2k-1} \\ \theta_{2k} \end{matrix} \right\}.$$

The order in which the columns are quantized first does not change final performance and can be arbitrary. Alternatively, all columns may be processed contemporaneously, in parallel, or some combination of parallel and serial processing.

In the two-dimensional case, a proper codebook is needed. Take S=2, B=3 for example. Since the phase information is restricted between $-\pi$ and $\pi$ for each phase information element, a simple codebook can be chosen as follows:

$$A = \left\{ \begin{bmatrix} 1 \\ 1 \end{bmatrix}, \begin{bmatrix} 1 \\ e^{i\frac{\pi}{4}} \end{bmatrix}, \begin{bmatrix} 1 \\ e^{i\frac{\pi}{2}} \end{bmatrix}, \begin{bmatrix} 1 \\ e^{i\frac{3\pi}{4}} \end{bmatrix}, \begin{bmatrix} 1 \\ e^{i\pi} \end{bmatrix}, \begin{bmatrix} 1 \\ e^{i\frac{5\pi}{4}} \end{bmatrix}, \begin{bmatrix} 1 \\ e^{i\frac{3\pi}{2}} \end{bmatrix}, \begin{bmatrix} 1 \\ e^{i\frac{7\pi}{4}} \end{bmatrix} \right\}$$

where each column is a two-dimensional codeword. Altogether 8 codewords may exist, in
certain embodiments, and they may be indexed by 3 bits.

Another embodiment is described for example. Take, for instance, S=4, B=5. In this case, the phase information vector $\vec{\theta} = [\theta_1, \theta_2, \ldots, \theta_N]^T$ into is divided into k segments.

$$\left\{ \begin{matrix} \theta_1 & \theta_5 & \ldots & \theta_{4k-3} \\ \theta_2 & \theta_6 & \ldots & \theta_{4k-2} \\ \theta_3 & \theta_7 & \ldots & \theta_{4k-1} \\ \theta_4 & \theta_8 & \ldots & \theta_k \end{matrix} \right\}$$

where each column represents a segment with size S=4.

A 4-dimensional vector quantization can be applied for each segment in parallel, series, or some combination of parallel and series processing. The corresponding codebook may be $$A = \begin{bmatrix} e^{i\frac{2\pi}{32}0\cdot 18} & e^{i\frac{2\pi}{32}1\cdot 18} & e^{i\frac{2\pi}{32}2\cdot 18} & \ldots & e^{i\frac{2\pi}{32}31\cdot 18} \\ e^{i\frac{2\pi}{32}0\cdot 27} & e^{i\frac{2\pi}{32}1\cdot 27} & e^{i\frac{2\pi}{32}2\cdot 27} & \ldots & e^{i\frac{2\pi}{32}31\cdot 27} \\ e^{i\frac{2\pi}{32}0\cdot 30} & e^{i\frac{2\pi}{32}1\cdot 30} & e^{i\frac{2\pi}{32}2\cdot 30} & \ldots & e^{i\frac{2\pi}{32}31\cdot 30} \\ e^{i\frac{2\pi}{32}0\cdot 31} & e^{i\frac{2\pi}{32}1\cdot 31} & e^{i\frac{2\pi}{32}2\cdot 31} & \ldots & e^{i\frac{2\pi}{32}31\cdot 31} \end{bmatrix}$$

where each column is a 4-dimentional codeword. Altogether 32 codewords may exist, in certain embodiments, and they may be indexed by 5 bits.

As in the scalar quantization case, the codebook can be reused for each segment. It is appreciated that, as the segment size S is tuned, different tradeoffs of complexity, performance, and efficiency can be achieved.

It is also noted that the disclosed hybrid quantization applies for even and odd numbers of antennas. For example, if N=2k+1, an odd number, the input vector can be divided into multiple segments again, with the last segment having less number of elements than other segments. Alternatively, the last segment may have a greater number of elements than other segments. For segments that have the same length, a common codebook can be reused. Each segment that has a different length may need a new codebook in some other dimension.

Designing a Training Matrix

Beamforming vector estimation is generally done by sending out a sequence of training symbols that is known to both the transmitter and the receiver. In some embodiments, the training sequence includes a repetition of the same training symbols, modulated by different pre-determined beamforming patterns across all the transmit antennas. Choice of a proper training matrix (interchangeably used with transfer matrix), which represents those pre-determined beamforming patterns as a group, can significantly improve the beam estimation performance.

For example, in one embodiment, an orthogonal Hadamard matrix can be used to construct the training matrix. In particular, let Q be the maximum number of transmit antennas, and N be the actual number of transmit antennas for a certain transmit station. It is thus always true that N≤Q. Design of the training matrix starts, in this embodiment, with a Hadamard matrix, D, of size Q×Q. In some embodiments, the training matrix A is simply chosen as the first N rows of the Hadamard matrix D, which consists of Q columns in an N-dimensional space, with each column being a candidate beamforming pattern to be transmitted in the training period. It is possible that all those Q beam patterns could be transmitted in the training period so as to reliably estimate the beamforming vectors.

Although choice of such a training matrix works toward estimating the beamforming vector, the overall estimation performance may be significantly improved by carefully choosing the rows of the Hadamard matrix, or in general, a unitary matrix.

It has been shown that the minimum number of training symbols in estimating the transmit beamforming vector is equal to the number of transmit antenna, N. In a wireless video data communication system, to allow for different numbers of transmitter antennas from different manufacturers and to avoid having knowledge of the number of transmitter antennas at the receiver side, a common maximum number of antennas Q is assumed, and altogether Q training symbols are transmitted, irrespective of the actual number of transmitter antennas at the transmit station. In one embodiment, the training matrix actually contains Q beam patterns, with each beam pattern being an N-dimensional vector. Mathematically, the training matrix can be represented by A, a size N×Q matrix, with each column being a beam pattern.

Theoretically, an embodiment may choose Q arbitrary vectors in the N-dimensional space as the training matrix. However, estimation performance does vary significantly, depending on the choice of the training matrix. One embodiment is based on the Hadamard matrix. Basically, let D be the Q×Q orthogonal Hadamard matrix and let A be the N×Q training matrix to be designed. Then the transfer matrix A can be chosen as the first N rows of the Hadamard matrix D. In this embodiment, each column of A may be used as a beamforming pattern, one after another, for each training symbol during the entire training period, which is of length Q symbols.

In one embodiment, in estimating the beamforming vector, it is advantageous to have all training patterns be uncorrelated with (or orthogonal to) each other. In this embodiment, it is advantageous to have all candidate beam patterns in the training matrix to be as orthogonal as possible. The above approach (of selecting the first N rows) does not strongly support such a general principle. Instead, in another embodiment, the following training matrix design approach is suggested, where the beam patterns are chosen as orthogonal as possible.

In particular, let $A=[A_1\ A_2\ \ldots\ A_Q]$ be the size N×Q matrix to be designed, where each $A_i$ is a candidate beam pattern in the N-dimensional space. Construction of the transfer matrix will be based on an orthogonal matrix in the real case or unitary matrix in the complex case. A matrix B of size M×M is orthogonal if $BB^T=B^T B=I$, where $T$ represents the transpose of a matrix and I is the identity matrix. Similarly, a matrix B of size M×M is unitary if $BB^H=B^H B=I$, where $H$ represents the complex conjugate transpose of a matrix and I is the identity matrix.

Instead of choosing the first N rows out of the size Q×Q orthogonal matrix, in some embodiments, the N rows are chosen carefully. For example, let $d_i$ be the ith row of the orthogonal matrix D, and $r_1, r_2, \ldots, r_N$ be the indices of the carefully chosen N rows. Thus, the training matrix A can be written as $$A = [A_1\ A_2\ \ldots\ A_Q] = \begin{bmatrix} d_{r_1} \\ d_{r_2} \\ \vdots \\ d_{r_N} \end{bmatrix}.$$

To understand the method in finding the proper N rows from the original orthogonal matrix, a performance metric is introduced, for use in some embodiments of the invention. The performance metric, in one embodiment, measures how orthogonal/correlated the beam patterns in a given transfer matrix are with each other.

Particularly, let $R=A^T A$ be the correlation matrix of A, which is of size Q×Q, and $Rc=A^T A-I$ be the cross-correlation matrix, where all auto-correlation values (corresponding to the entries on the diagonal) have been removed. The performance metric can be chosen as $$S=\max_{2D}(abs(R_c)),$$

where abs(Rc) gives the absolute value of the matrix Rc, element by element, and $\max_{2D}$ gives the maximum value across two dimensions of the matrix. In one embodiment, the newly introduced performance metric is actually the maximum absolute value of the cross correlation matrix. Such a metric may give an important indication on how orthogonal the beam patterns are with each other.

In one example, when Q beams are orthogonal, the cross-correlation matrix is an all-zero matrix, with S being zero. In another example, when all beam patterns are chosen to be the same, is can be easily inferred that the total correlation matrix is an all-one matrix, and the maximum absolute value of the cross-correlation matrix is one. In general, when the candidate beams are close to orthogonal, the performance metric would take a small value around zero.

Thus, to make the beams patterns as orthogonal as possible, one embodiment of the invention may simply choose the row indices such that the maximum absolute value of the cross-correlation matrix is minimized. Mathematically, the follow integer optimization problem needs to be solved $$\min_{\{r_1, r_2, \ldots, r_N\}} (\max_{2D} (abs(A^A A - I))).$$

Such an integer optimization program may be difficult to solve, in general, and brute force numerical search or random numerical search may be resorted to. Fortunately, design of the training matrix can be done off-line, and thus the numerical search does not place any burden on the real-time complexity.

Figure 9:
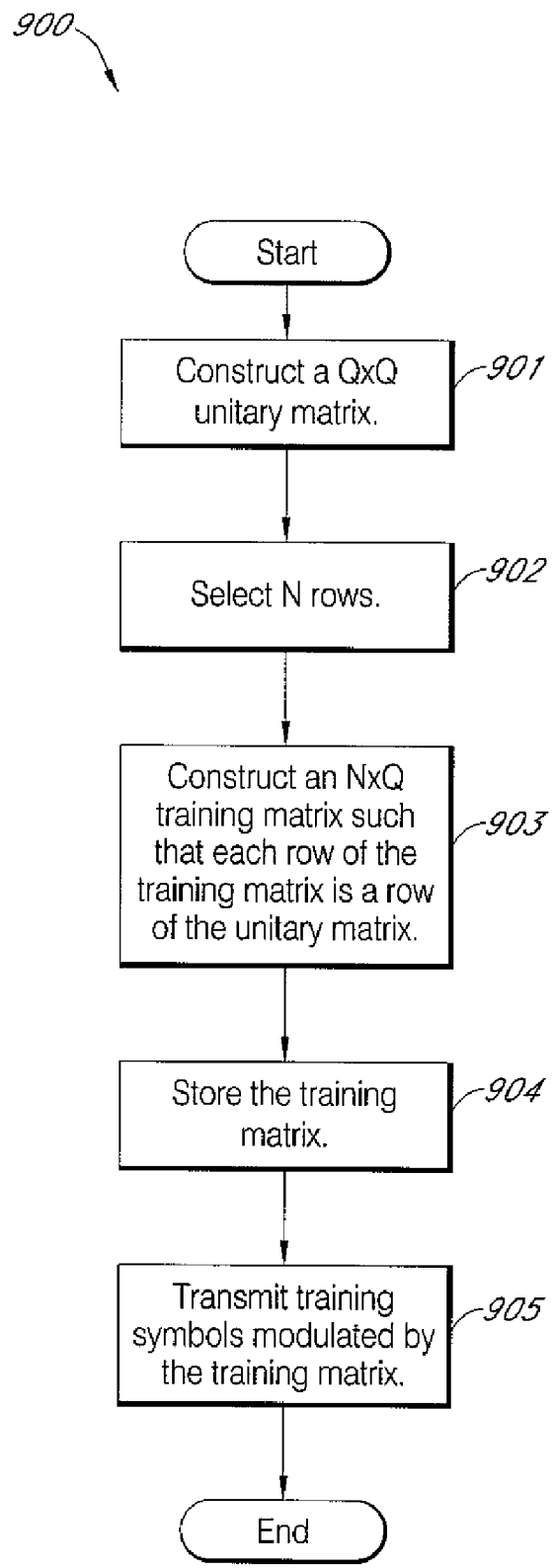
FIG. 9 is a flowchart which shows a beamforming procedure based on transfer matrix design utilizing a unitary matrix according to another embodiment of the invention.
Figure 10A:
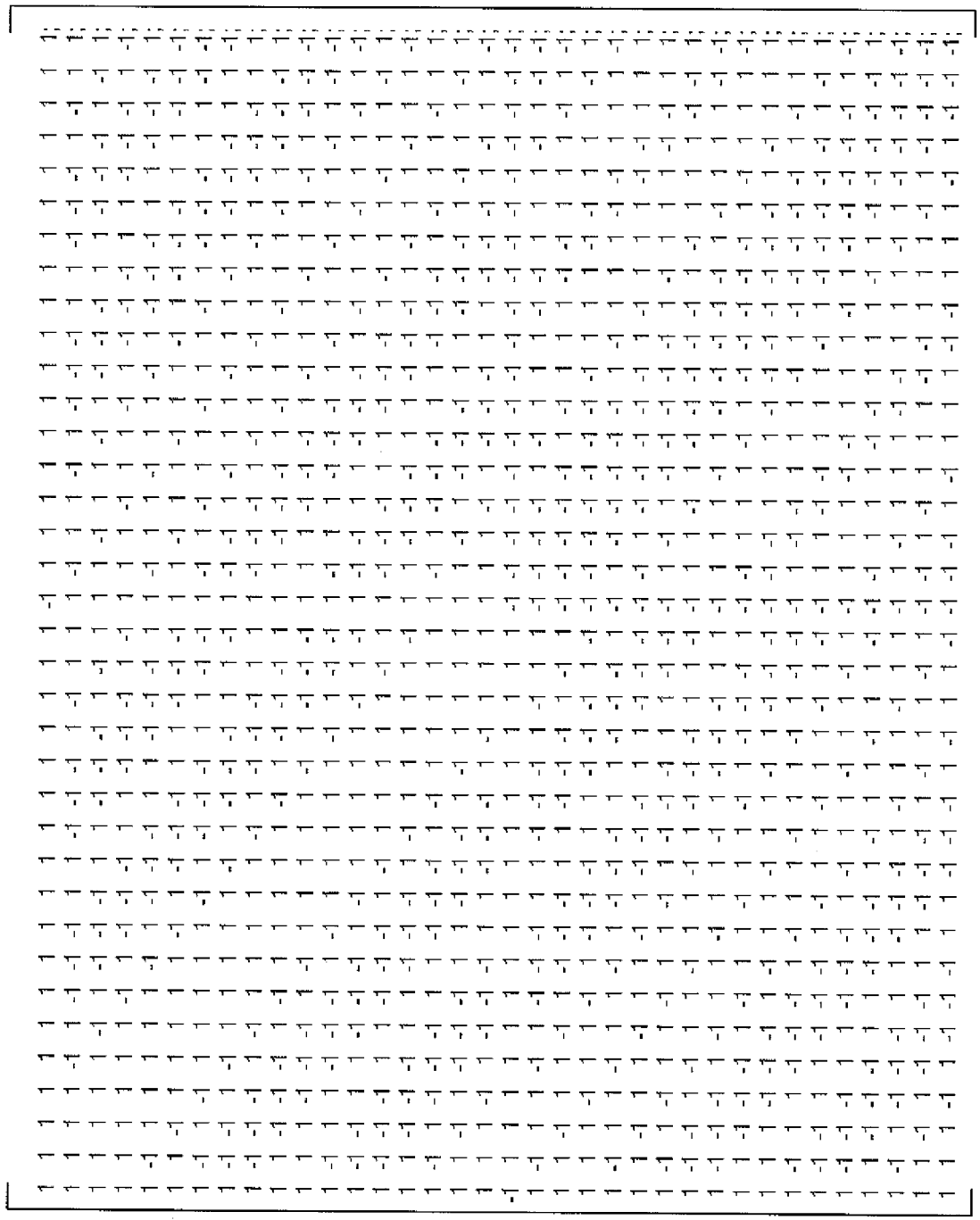
FIG. 10*a* is a matrix which can be used for the procedure of FIG. 9 according to one embodiment of the invention.

FIG. 9 is a flowchart which shows a beamforming procedure 900 based on transfer matrix design utilizing a unitary matrix according to another embodiment of the invention. The first stage is to construct or obtain a unitary matrix have Q rows and Q columns (901). N rows Q×Q unitary matrix to retain are selected (902). This selection may be done in order to maximize or minimize a performance metric. For example, the selection may be done such that, if the resulting training matrix is referred to as A, the following metric is minimized:

$$\max_{2D}(abs(A^H A-I))$$

wherein I is an identity matrix, abs is the absolute value element by element, and $\max_{2D}$ is the maximum value over two dimensions. In one embodiment, the rows are selected such that the resulting pre-determined beamforming patterns are maximally orthogonal. The next stage involves the construction a training matrix with N rows and Q columns (903). The following stage is to store the resulting training matrix (904). Then, the procedure 900 involves transmitting a training sequence using the training matrix (905). To further describe the procedure 900, listed in the following is one particular example, where Q is 36 and a Hadamard matrix (FIG. 10a) is used as the base unitary matrix in designing the transfer matrix. For different values of N, random numerical searches for finding the best rows to keep minimizing the above performance metric were carried out. The result of this searching is shown in FIG. 10b. Each row of the diagram in FIG. 10b lists the row indices which correspond to an abridged matrix of size N×Q with the minimum of the performance metric above, with each row corresponding to a different value of N.

It is noted once again that a Hadamard matrix need not be used in all embodiments of the invention. Other orthogonal or unitary matrices may be equally used, additionally including, but not limited to, Fourier matrices and Vandermonde matrices.

While the above description has pointed out novel features of the invention as applied to various embodiments, the skilled person will understand that various omissions, substitutions, and changes in the form and details of the device or process illustrated may be made without departing from the scope of the invention. For example, although embodiments of the invention have been described with reference to uncompressed video data, those embodiments can be applied to compressed video data as well. Therefore, the scope of the invention is defined by the appended claims rather than by the foregoing description. All variations coming within the meaning and range of equivalency of the claims are embraced within their scope.

What is claimed is:

1. A method of generating a number of candidate beamforming vectors for transmission of high definition video data over a wireless medium, the method comprising:
   determining the number (N) of transmitter antennas;
   determining the number (Q) of candidate beamforming vectors to be constructed;
   providing a discrete Fourier transform (DFT) matrix comprising Q rows and Q columns;
   selecting N rows of the DFT; and
   generating an abridged matrix using the selected N rows, wherein each column of the abridged matrix is configured to be used as a candidate beamforming vector for transmission of a high definition video data signal, wherein the resulting candidate beamforming vectors are based on a phase between $\pi$ and $-\pi$ it for each phase information element, and the N rows of the DFT matrix are selected using a performance metric for measuring beam pattern correlation and such that any pair of candidate beamforming vectors are maximally separated.

2. The method of claim 1, further comprising:
   determining a second number (L) of transmitter antennas, wherein L is less than N;
   selecting L rows of the abridged matrix; and
   generating a further abridged matrix using the selected L rows, wherein each column of the further abridged matrix is configured to be used as a candidate beamforming vector for transmission of a high definition video signal.

3. The method of claim 1, further comprising:
   determining a second number (P) of candidate beamforming vectors to be constructed, wherein P is less than Q;
   selecting P columns of the abridged matrix; and
   generating a further abridged matrix using the selected P columns, wherein each column of the further abridged matrix is configured to be used as a candidate beamforming vector for transmission of a high definition video signal.

4. The method of claim 1, wherein a computer search algorithm is used to select the N rows.

5. The method of claim 4, wherein a brute force search or random search method is used.

6. The method of claim 1, wherein Q is at least two, and the N rows of the DFT matrix are selected to minimize the maximum of the absolute value of the correlation between any two different candidate beamforming vectors.

7. The method of claim 1, wherein the N rows of the DFT matrix are selected to optimize a performance metric.

8. The method of claim 1, wherein the high definition video data signal is uncompressed.

9. A system for generating a number of candidate beamforming vectors for transmission of high definition video data over a wireless medium, the system comprising:
   a memory configured to store a plurality of candidate beamforming vectors;
   a processor for executing software configured to:
   i) determine the number (N) of transmitter antennas and the number (Q) of candidate beamforming vectors to be constructed;
   ii) provide a discrete Fourier transform (DFT) matrix comprising Q rows and Q columns;
   iii) select N rows of the DFT matrix; and
   iv) generate an abridged matrix using the selected N rows, wherein each column of the abridged matrix is configured to be used as a candidate beamforming vector for transmission of a high definition video data signal, wherein the N rows of the DFT matrix are selected using a performance metric for measuring beam pattern correlation and such that any pair of candidate beamforming vectors are maximally separated.

10. The system of claim 9, wherein the memory is contained within the transceiver.

11. The system of claim 9, wherein the processor comprises a first to fourth module, each module performing i)-iv), respectively.

12. The system of claim 9, wherein the processor is further configured to:
    v) determine a second number (L) of transmitter antennas, wherein L is less than N;
    vi) select L rows of the abridged matrix; and
    vii) generate a further abridged matrix using the selected L rows, wherein each column of the further abridged matrix is configured to be used as a candidate beamforming vector for transmission of a high definition video signal.

13. The system of claim 9, wherein the processor is further configured to:
    v) determine a second number (P) of candidate beamforming vectors to be constructed, wherein P is less than Q;
    vi) select P columns of the abridged matrix; and
    viii) generate a further abridged matrix using the selected P columns, wherein each column of the further abridged matrix is configured to be used as a candidate beamforming vector for transmission of a high definition video signal.

14. The system of claim 9, wherein the N rows of the DFT matrix are selected such that a performance metric (S) is optimized.

15. The system of claim 9, wherein the system is implemented with one of the following: a HDTV set, a projector, and a computing device.

16. The system of claim 9, wherein the system is implemented with one of the following: a set-top box, a DVD player or recorder, a digital camera, a camcorder, and a computing device.

17. The system of claim 9, wherein the high definition video data is uncompressed.

18. A system for generating a number of candidate beamforming vectors for transmission of high definition video data over a wireless medium, the system comprising:
    means for determining the number (N) of transmitter antennas;
    means for determining the number (Q) of candidate beamforming vectors to be constructed;
    means for providing a discrete Fourier transform (DFT) matrix comprising Q rows and Q columns;
    means for selecting N rows of the DFT matrix; and
    means for generating an abridged matrix using the selected N rows, wherein each column of the abridged matrix is configured to be used as a candidate beamforming vector for transmission of a high definition video data signal, wherein Q is at least two, and the N rows of the DFT matrix are selected using a performance metric for measuring beam pattern correlation and such that any pair of candidate beamforming vectors are maximally separated.

19. One or more processor-readable storage devices having processor-readable code, the processor-readable code for programming one or more processors to perform a method of generating a number of candidate beamforming vectors for transmission of high definition video data over a wireless medium, the method comprising:
 determining the number (N) of transmitter antennas;
 determining the number (Q) of candidate beamforming vectors to be constructed;
 providing a discrete Fourier transform (DFT) matrix comprising Q rows and Q columns;
 selecting N rows of the DFT matrix; and
 generating an abridged matrix using the selected N rows, wherein each column of the abridged matrix is configured to be used as a candidate beamforming vector for transmission of a high definition video data signal, wherein the N rows of the DFT matrix are selected using a performance metric for measuring beam pattern correlation and such that any pair of candidate beamforming vectors are maximally separated.

20. A method of generating a number of candidate beamforming vectors for transmission of high definition video data over a wireless medium, the method comprising:
 determining the number (N) of transmitter antennas;
 determining the number (Q) of candidate beamforming vectors to be constructed;
 providing a discrete Fourier transform (DFT) matrix comprising Q rows and Q columns;
 selecting N rows of the DFT matrix; and
 generating an abridged matrix using the selected N rows, wherein each column of the abridged matrix is configured to be used as a candidate beamforming vector for transmission of a high definition video data signal, wherein Q is at least two and the N rows of the DFT matrix are selected to minimize a performance metric (S),
wherein $$S = \max_{1 \leq i \neq j \leq Q} |w_i^H w_j|,$$

wherein, $w_i$ is the ith candidate beamforming vector, $w_i^H$ is the complex conjugate transpose of $w_i$, $|w_i^H w_j|$ is the absolute value of $w_i^H w_j$, and $$\max_{1 \leq i \neq j \leq Q} |w_i^H w_j|$$

is the maximum value of $|w_i^H w_j|$ over unequal values of I and j between 1 and Q.

21. A system for generating a number of candidate beamforming vectors for transmission of high definition video data over a wireless medium, the system comprising:
 a memory configured to store a plurality of candidate beamforming vectors;
 a processor for executing software configured to:
  i) determine the number (N) of transmitter antennas and the number (Q) of candidate beamforming vectors to be constructed;
  ii) provide a discrete Fourier transform (DFT) matrix comprising Q rows and Q columns;
  iii) select N rows of the DFT matrix; and
  iv) generate an abridged matrix using the selected N rows, Wherein each column of the abridged matrix is configured to be used as a candidate beamforming vector for transmission of a high definition video data signal, wherein Q is at least two and the N rows of the DFT matrix are selected to minimize a performance metric (S), wherein $$S = \max_{1 \leq i \neq j \leq Q} |w_i^H w_j|,$$

wherein, $w_i$ is the ith candidate beamforming vector, $w_i^H$ is the complex conjugate transpose of $w_i$, $|w_i^H w_j|$ is the absolute value of $w_i^H w_j$, and $$\max_{1 \leq i \neq j \leq Q} |w_i^H w_j|$$

is the maximum value of $|w_i^H w_j|$ over unequal values of I and j between 1 and Q.

22. A method of generating a number of candidate beamforming vectors for transmission of high definition video data over a wireless medium, the method comprising:
 determining the number (N) of transmitter antennas;
 determining the number (Q) of candidate beamforming vectors to be constructed;
 providing a discrete Fourier transform (DFT) matrix comprising Q rows and Q columns;
 selecting N rows of the DFT matrix; and
 generating an abridged matrix using the selected N rows, wherein each column of the abridged matrix is configured to be used as a candidate beamforming vector for transmission of a high definition video data signal, wherein the resulting candidate beamforming vectors are $$\begin{bmatrix}1\\1\end{bmatrix}, \begin{bmatrix}1\\e^{i\frac{\pi}{4}}\end{bmatrix}, \begin{bmatrix}1\\e^{i\frac{\pi}{2}}\end{bmatrix}, \begin{bmatrix}1\\e^{i\frac{3\pi}{4}}\end{bmatrix}, \begin{bmatrix}1\\e^{i\pi}\end{bmatrix}, \begin{bmatrix}1\\e^{i\frac{5\pi}{4}}\end{bmatrix}, \begin{bmatrix}1\\e^{i\frac{3\pi}{2}}\end{bmatrix}, \text{ and } \begin{bmatrix}1\\e^{i\frac{7\pi}{4}}\end{bmatrix}.$$

23. The method of claim 1, wherein each column of a corresponding codebook comprises a multi-dimensional codeword.

24. The method of claim 1, wherein transmission of high definition (HD) video data over a wireless medium comprises directional HD video transmission over a high-rate channel comprising multiple Gb/s bandwidth, and bi-directional transmission of control frames over a low-rate channel comprising up to 40 Mb/s bandwidth.

25. The method of claim 1, further comprising:
 transmitting a training sequence comprising a repetition of same training symbols, modulated by different pre-determined beamforming patterns across all the transmit antennas, wherein the DFT matrix represents the predetermined patterns, transmission of high definition (HD) video data over a wireless medium comprises directional HD video transmission over a high-rate channel comprising multiple Gb/s bandwidth, and bi-directional transmission of control frames over a low-rate channel comprising up to 40 Mb/s bandwidth.

26. The method of claim 1, wherein the resulting candidate beamforming vectors are restricted between the phase range of π and −π for each phase information element.

27. The method of claim 26, wherein each column comprises a two-dimensional codeword indexed by three bits.

28. The method of claim 26, wherein each column comprises a four-dimensional codeword indexed by five bits.

29. The method of claim 1, wherein the N rows of the DFT matrix are selected to minimize the performance metric, wherein the performance metric comprising:

$$\max_{2D}(abs(A^H A - I))$$

wherein A is a training matrix, $A^H$ is a complex conjugate of A, I is an identity matrix, abs is the absolute value element by element, and $\max_{2D}$ is the maximum value over two dimensions.

30. The method of claim 1, wherein the performance metric is based on a training matrix, a complex conjugate of the training matrix and an identity matrix is minimized.

31. The method of claim 1, wherein the performance metric is used for measuring correlation of beam patterns within a training matrix.

32. The method of claim 1, wherein the performance metric is used for measuring orthogonality of beam patterns within a training matrix.

* * * * *